United States Patent
Ragner et al.

(10) Patent No.: US 6,948,527 B2
(45) Date of Patent: Sep. 27, 2005

(54) PRESSURE-ACTUATED LINEARLY RETRACTABLE AND EXTENDIBLE HOSE

(75) Inventors: Gary Dean Ragner, 711 SW. 75th St. #103, Gainesville, FL (US) 32607; Robert Daniel deRochemont, Jr., 4308 NW. 10th Pl., Gainesville, FL (US) 32607

(73) Assignees: Gary Dean Ragner, Gainesville, FL (US); Robert Daniel deRochemont, Jr., Gainesville, FL (US)

( * ) Notice: Subject to any disclaimer, the term of this patent is extended or adjusted under 35 U.S.C. 154(b) by 179 days.

(21) Appl. No.: 10/303,941

(22) Filed: Nov. 25, 2002

(65) Prior Publication Data

US 2003/0098084 A1 May 29, 2003

Related U.S. Application Data

(60) Provisional application No. 60/335,497, filed on Nov. 24, 2001.

(51) Int. Cl.$^7$ ............................... F16L 11/00; A47L 5/36
(52) U.S. Cl. ........................ 138/119; 138/118; 138/46; 15/314; 15/414; 239/281
(58) Field of Search ........................... 138/46, 118, 119, 138/37, 39; 239/195–198, 208, 281, 280.5, 532, 557.1; 251/243, 242, 236; 15/314, 414, 321, 327.1–327.7

(56) References Cited

U.S. PATENT DOCUMENTS

| | | | |
|---|---|---|---|
| 2,396,059 A | 3/1946 | Roberts | 138/122 |
| 2,927,625 A | 3/1960 | Rothermel | 138/122 X |
| 2,954,802 A | 10/1960 | Duff | 138/122 |
| 2,961,007 A | 11/1960 | Martin | 138/122 |
| 3,288,169 A | 11/1966 | Moss | 138/118 |
| 3,520,725 A * | 7/1970 | Hamrick | 134/21 |
| 3,623,500 A * | 11/1971 | Hoy | 137/899 |
| 3,966,121 A | 6/1976 | Littman | 239/197 |
| 4,009,734 A | 3/1977 | Sullivan | 138/125 |
| 4,704,765 A * | 11/1987 | Ataka | 15/323 |

(Continued)

FOREIGN PATENT DOCUMENTS

| | | | | |
|---|---|---|---|---|
| DE | 19738329 A1 * | 3/1999 | | A47L/5/36 |
| WO | WO 9935954 A1 * | 7/1999 | | A47L/9/24 |
| WO | WO 3024294 A1 * | 3/2003 | | A47L/9/24 |

*Primary Examiner*—Patrick Brinson

(57) ABSTRACT

A linearly self-actuated hose for use in transporting fluids (liquids, gases, solid particles, and combinations of these three). Hoses (30) and (30b) have a biasing spring (36) extends along the full length, and can comprise single or multiple springs and/or multiple diameter spring coils. Spring (36) is covered with hose cover material (32) on the outside and hose cover material (34) on the inside to form a sealed hose and are bowed inward or outward radially between the individual spring coils depending on the intended use of hose (30) or (30b), respectfully to give the cover materials room to move out of the way when the hose retracts and the coils of spring (36) are forced close together. Hose (30b) is designed with a source end (26) and a output end (68). A pressure control mechanism is used on output end (68) to control the extending and retracting of hose (30b). The Linearly Retractable Hose is operated by changing internal pressure within the hose relative to the ambient pressure on the exterior of the hose. Control of fluid pressure within hose (30b) is what allows the hose to operate as an automatically extendable and retractable hose. The biasing of spring (36) depends on the type of use for the hose. For hose (30b) which will be used as a vacuum hose then the biasing spring (30b) must exert an extending force on the cover material (opposite that for a pressure hose). If the hose is to be used as pressure hose (30) (garden hose, etc.), spring (36) will need to have a bias that exerts a retracting force on cover materials (32) and (34).

10 Claims, 12 Drawing Sheets

U.S. PATENT DOCUMENTS

Figure 7B:
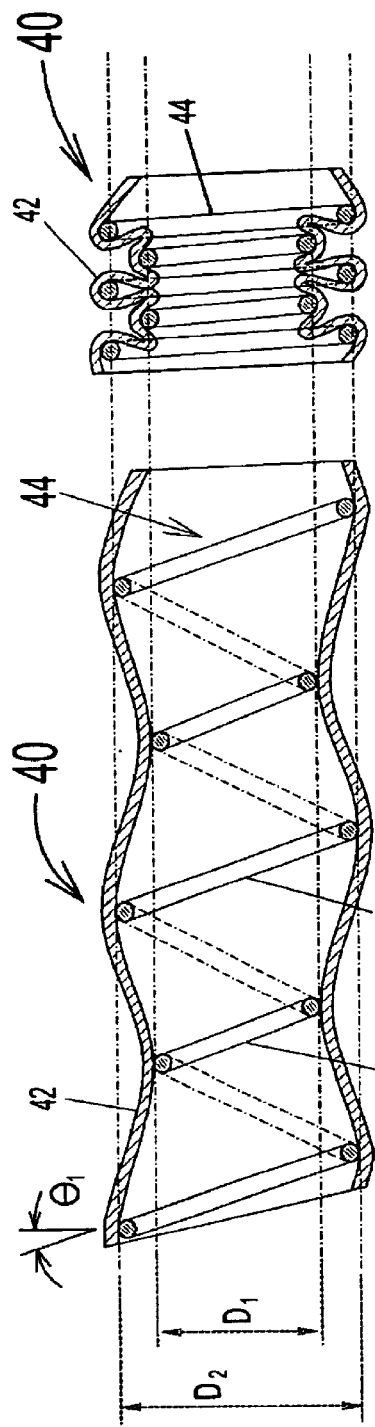

| Patent No. | Date | Inventor | Class |
|---|---|---|---|
| 4,955,106 A | 9/1990 | Stein | 15/335 |
| 5,023,959 A | 6/1991 | Mercer | 4/321 |
| 5,156,349 A | 10/1992 | Wilson | 242/388.9 |
| 5,485,870 A | 1/1996 | Kraik | 138/122 |
| 5,526,842 A | 6/1996 | Christensen | 137/360 |
| 5,555,915 A | 9/1996 | Kanao | 138/133 |
| 5,607,107 A | 3/1997 | Grieve | 239/195 |
| 5,740,581 A | 4/1998 | Harrelson, II | 15/314 |
| 5,778,941 A | 7/1998 | Inada | 138/134 |
| 6,024,132 A | 2/2000 | Fujimoto | 138/122 |
| 6,024,134 A | 2/2000 | Akedo | 138/129 |
| 6,098,666 A | 8/2000 | Wells | 138/115 |
| 6,182,327 B1 | 2/2001 | Gosselin | 15/315 |
| 6,186,181 B1 | 2/2001 | Schippl | 138/112 |
| 6,223,777 B1 | 5/2001 | Smith | 138/109 |
| 6,382,241 B1 | 5/2002 | Setrum | 137/355.22 |
| 2002/0013974 A1 * | 2/2002 | Gibson et al. | 15/315 |
| 2004/0231096 A1 * | 11/2004 | Battle et al. | 15/414 |

* cited by examiner

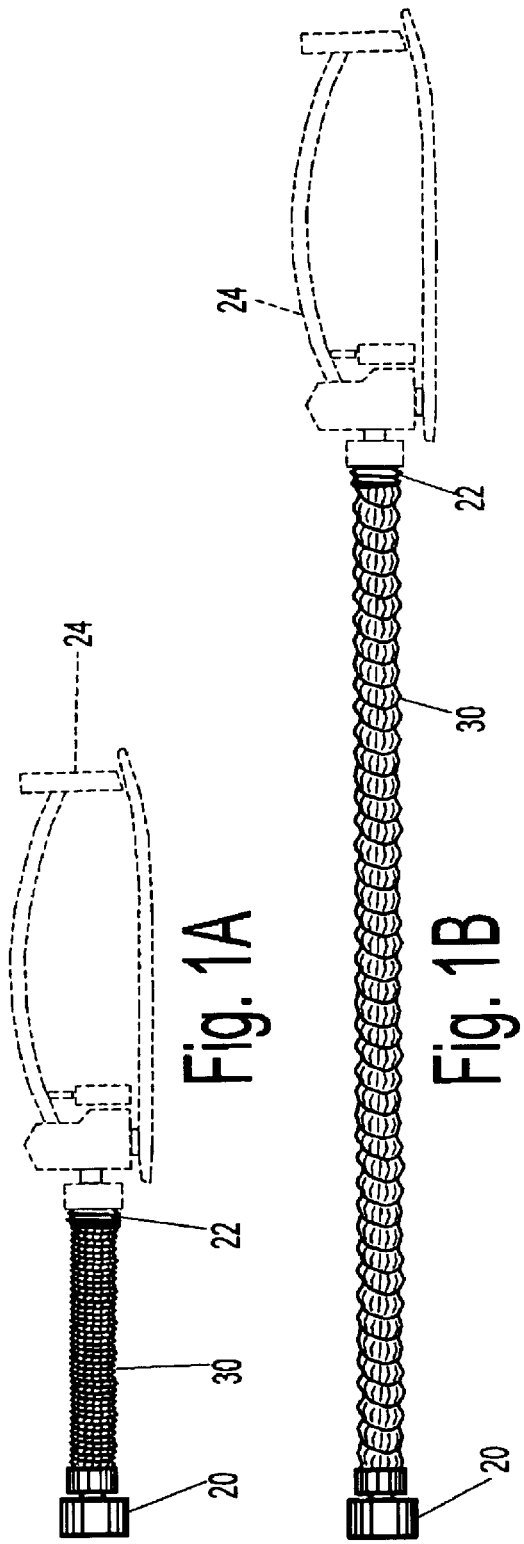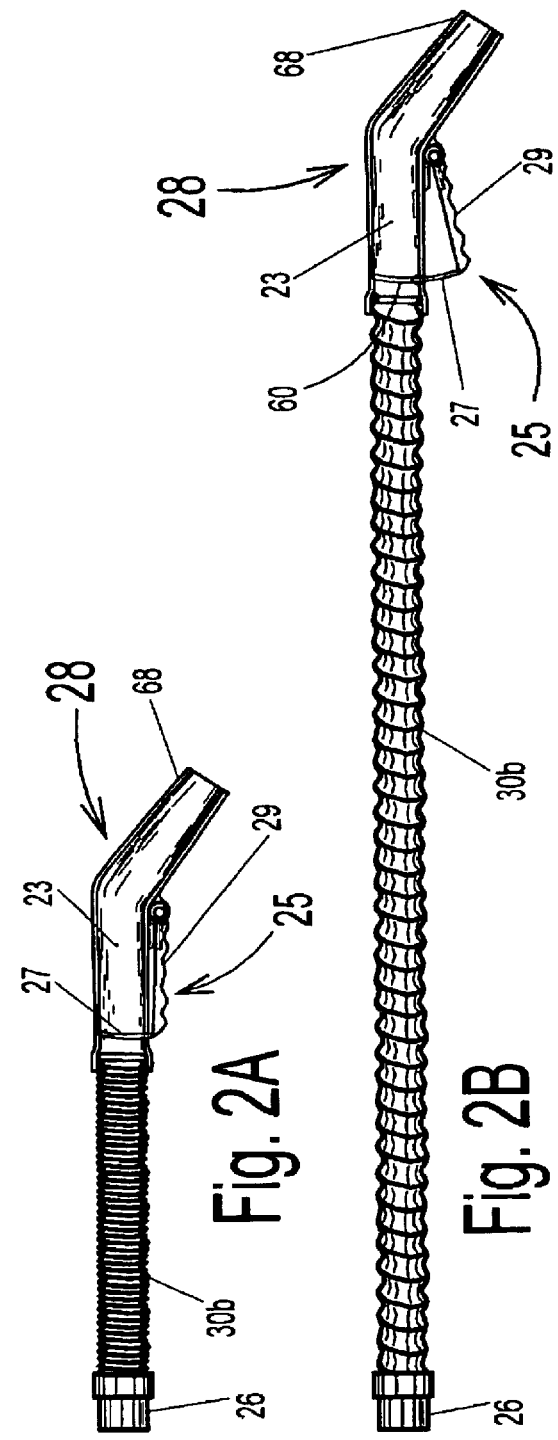

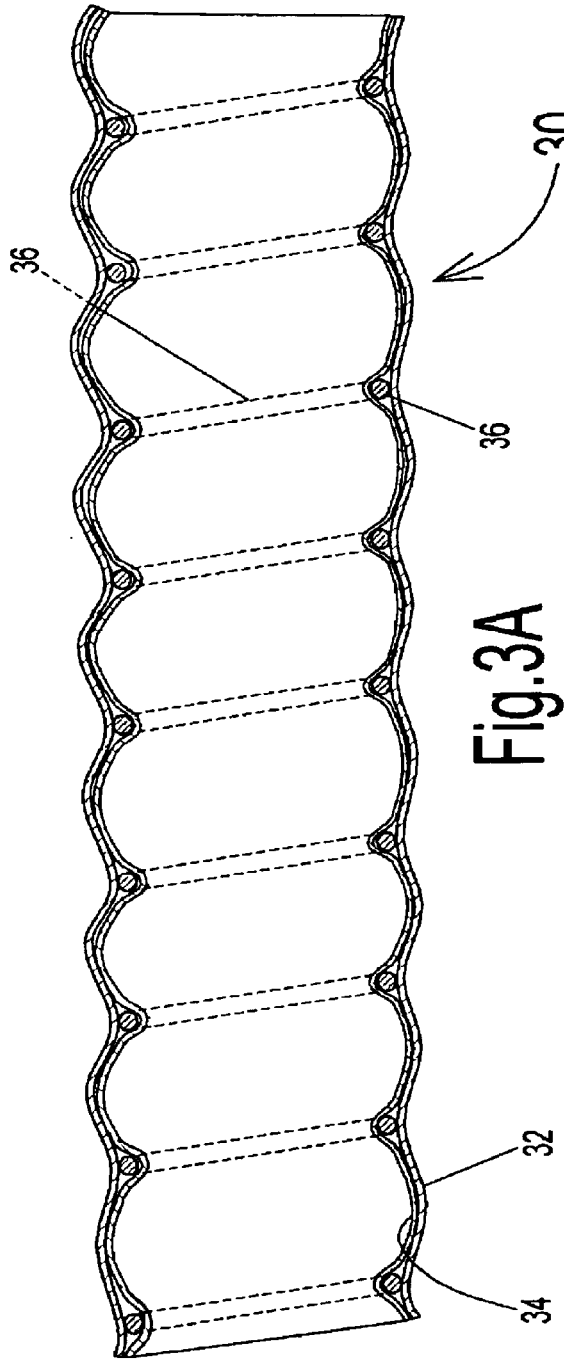
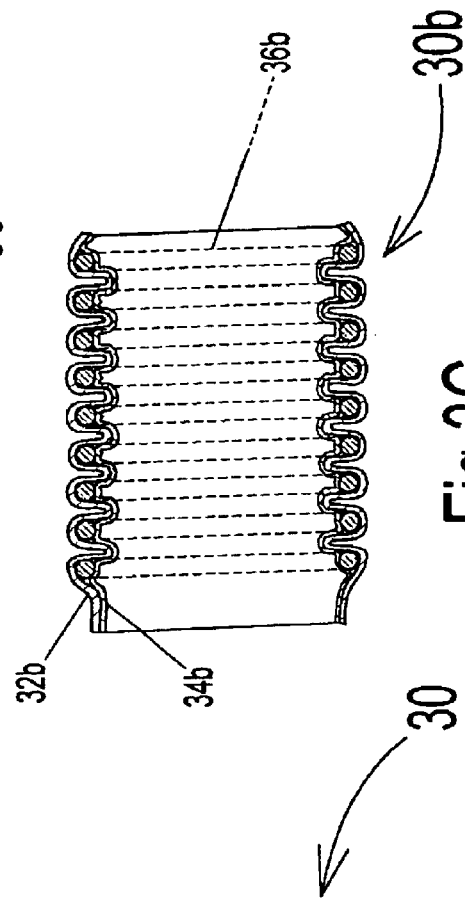
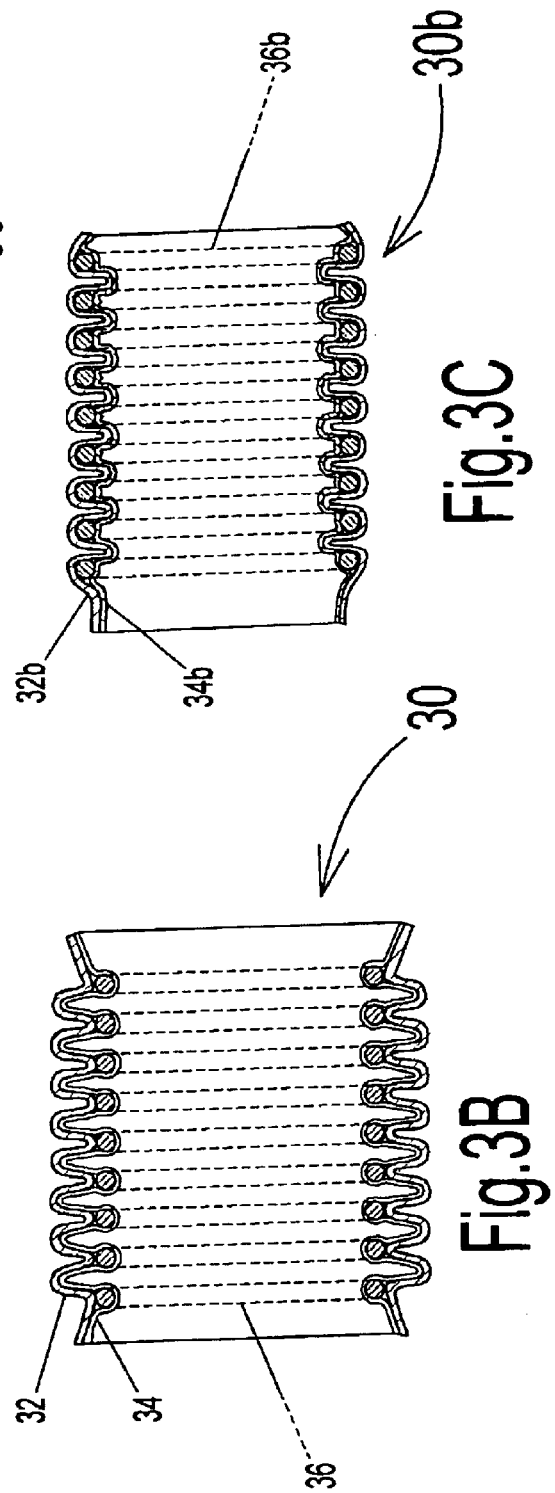

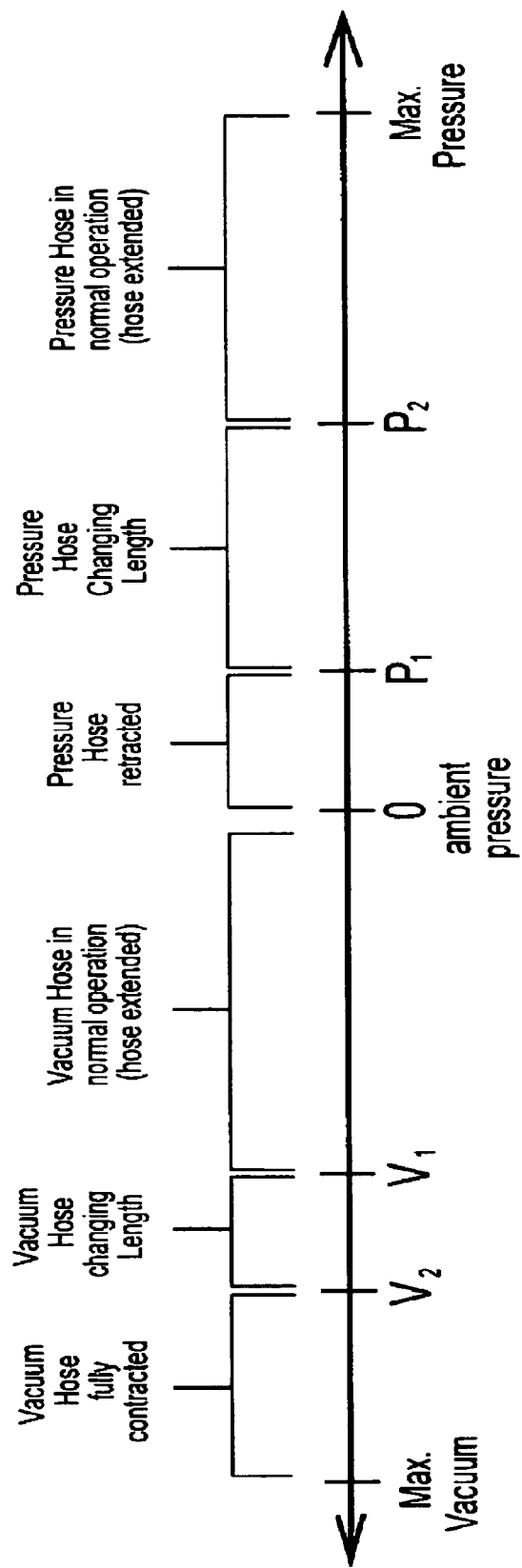
Fig. 4    Longitudinal Force Due to Fluid Pressure

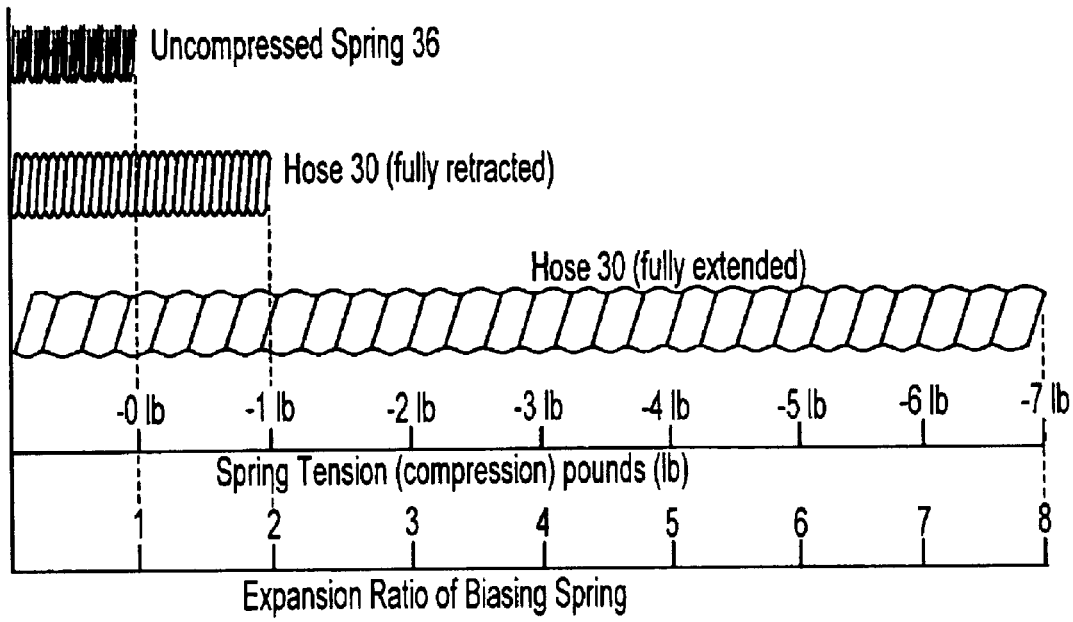
Fig. 5 - Spring-Bias Effects on Pressure Hose
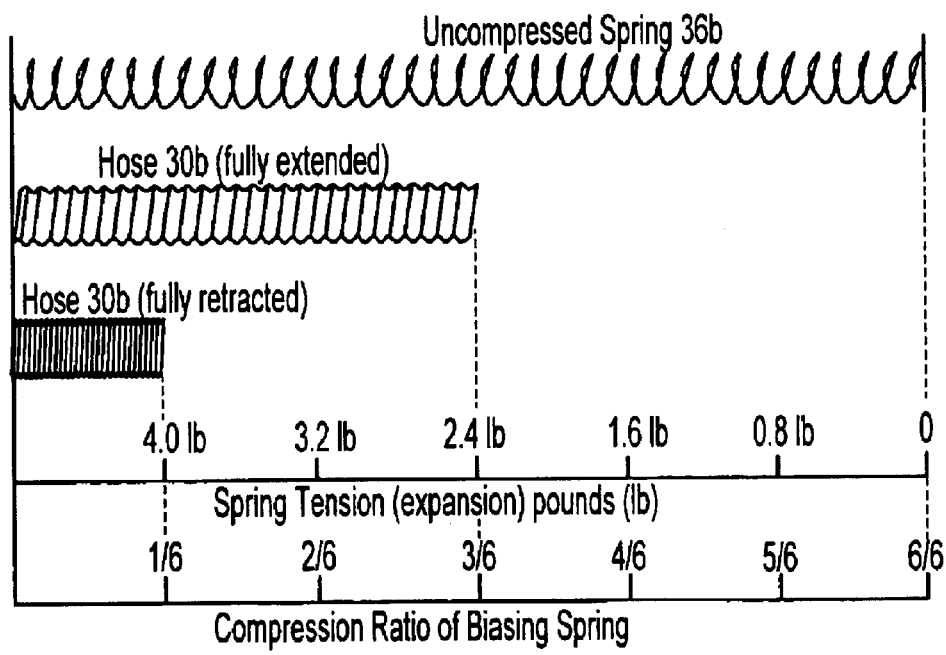
Fig. 6 - Spring Bias Effect on Vacuum Hose Fig. 7A  Variable Diameter Spring Coil Fig. 8A  Multiple Spring Coils

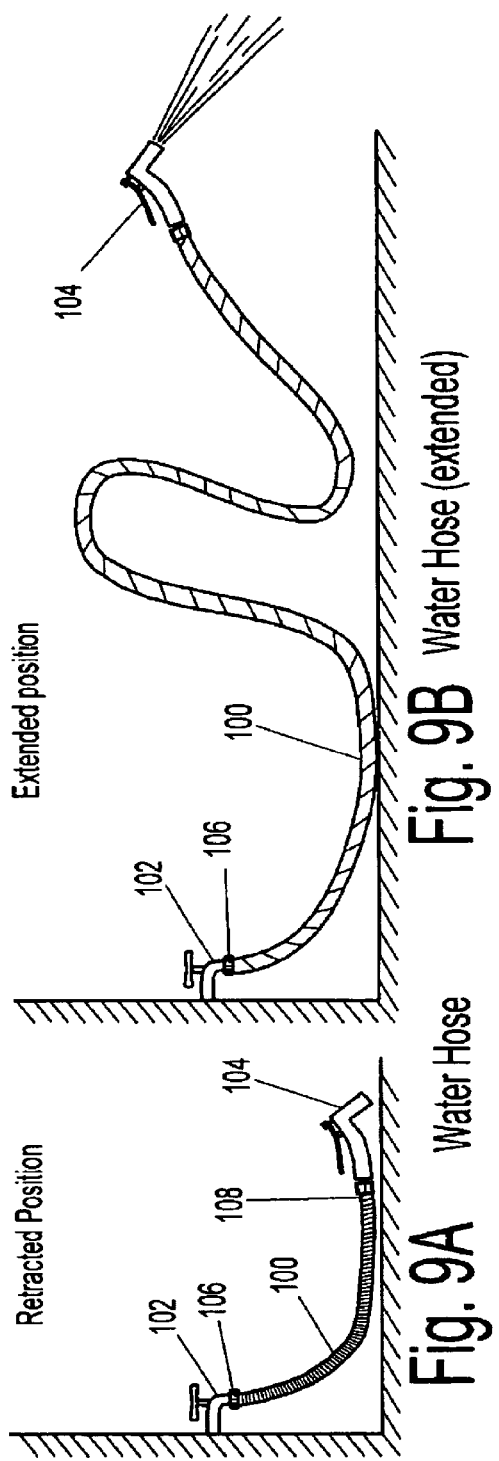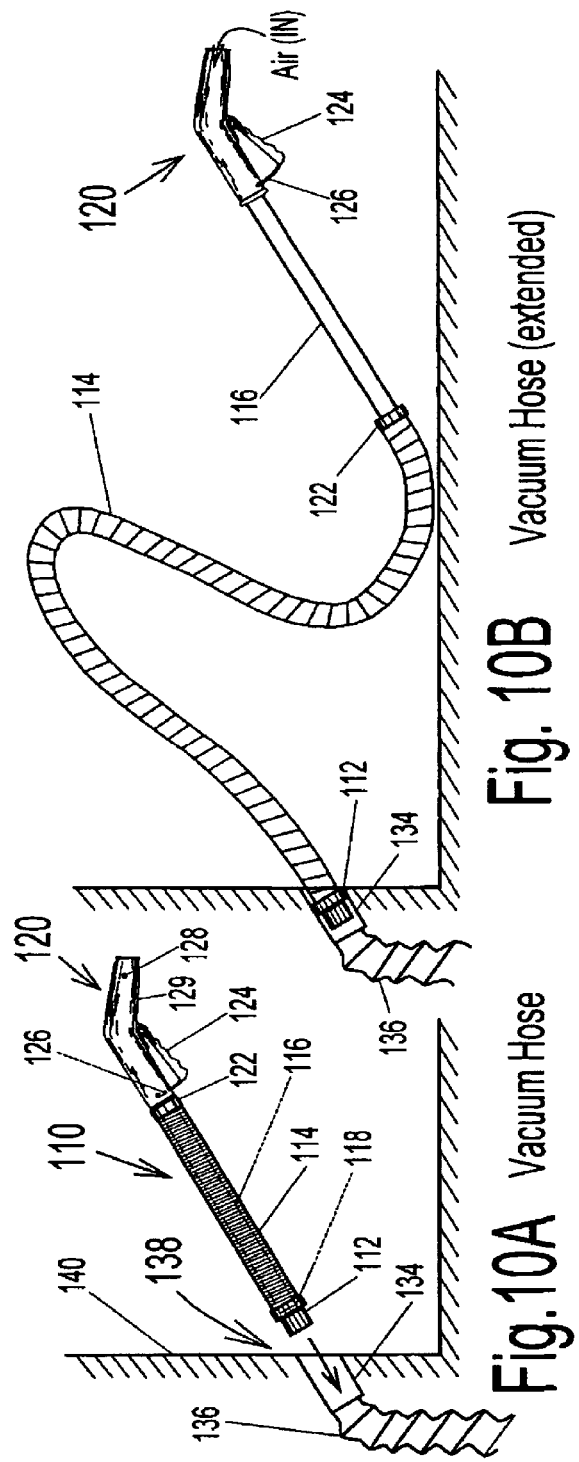

71 PRIOR ART

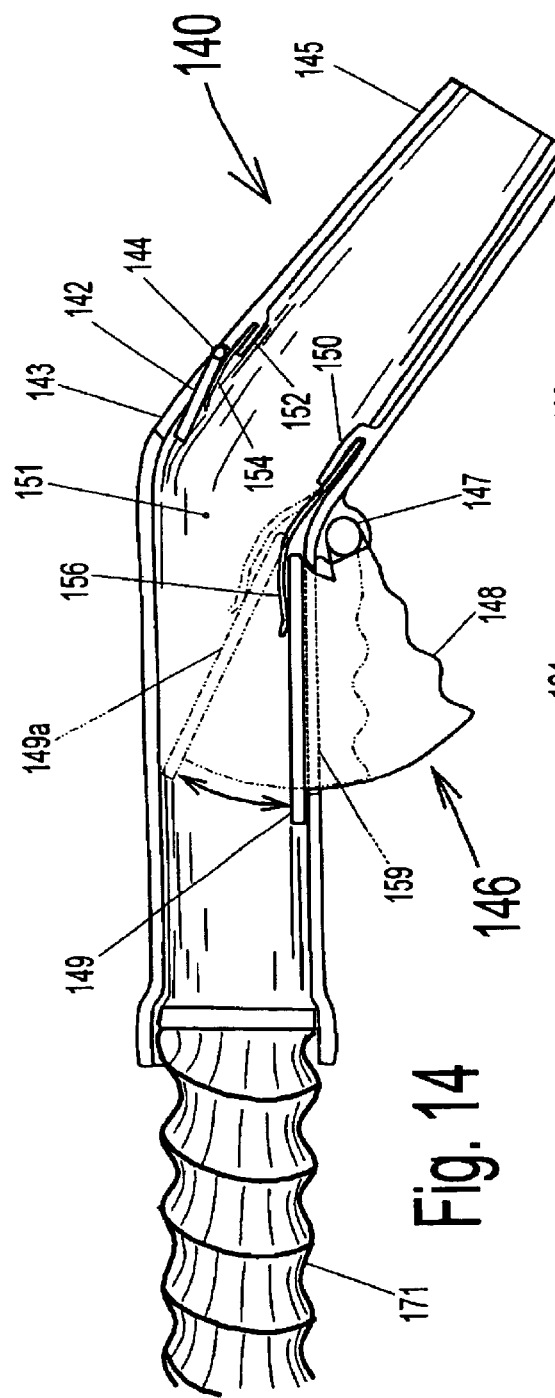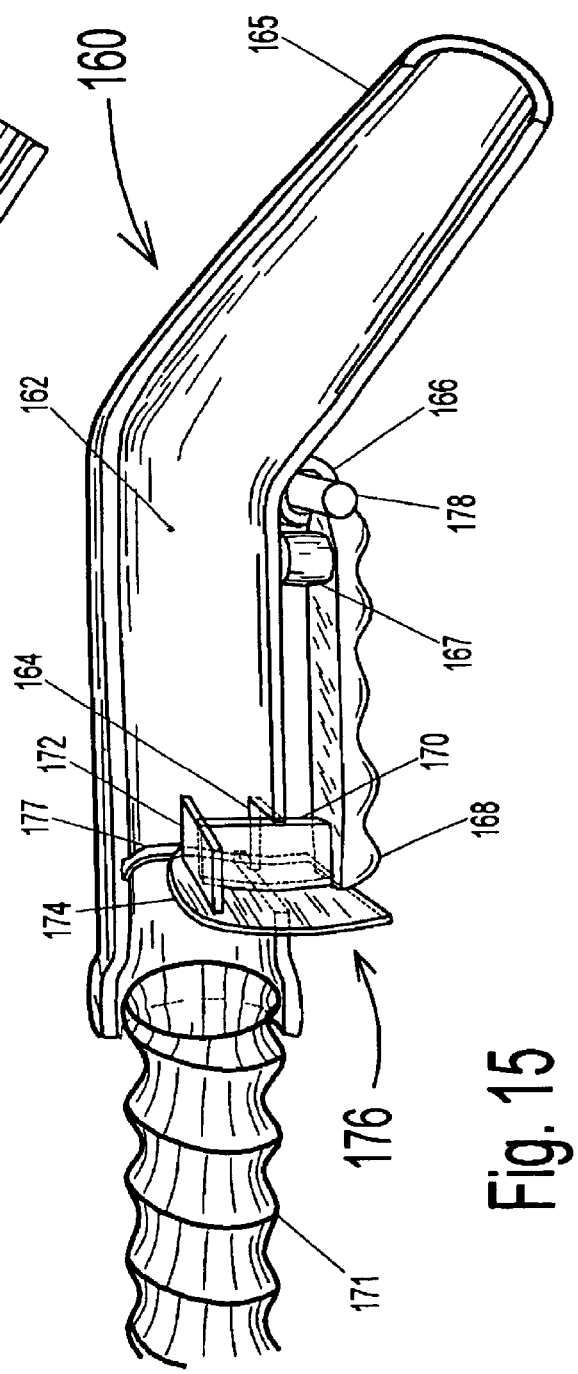

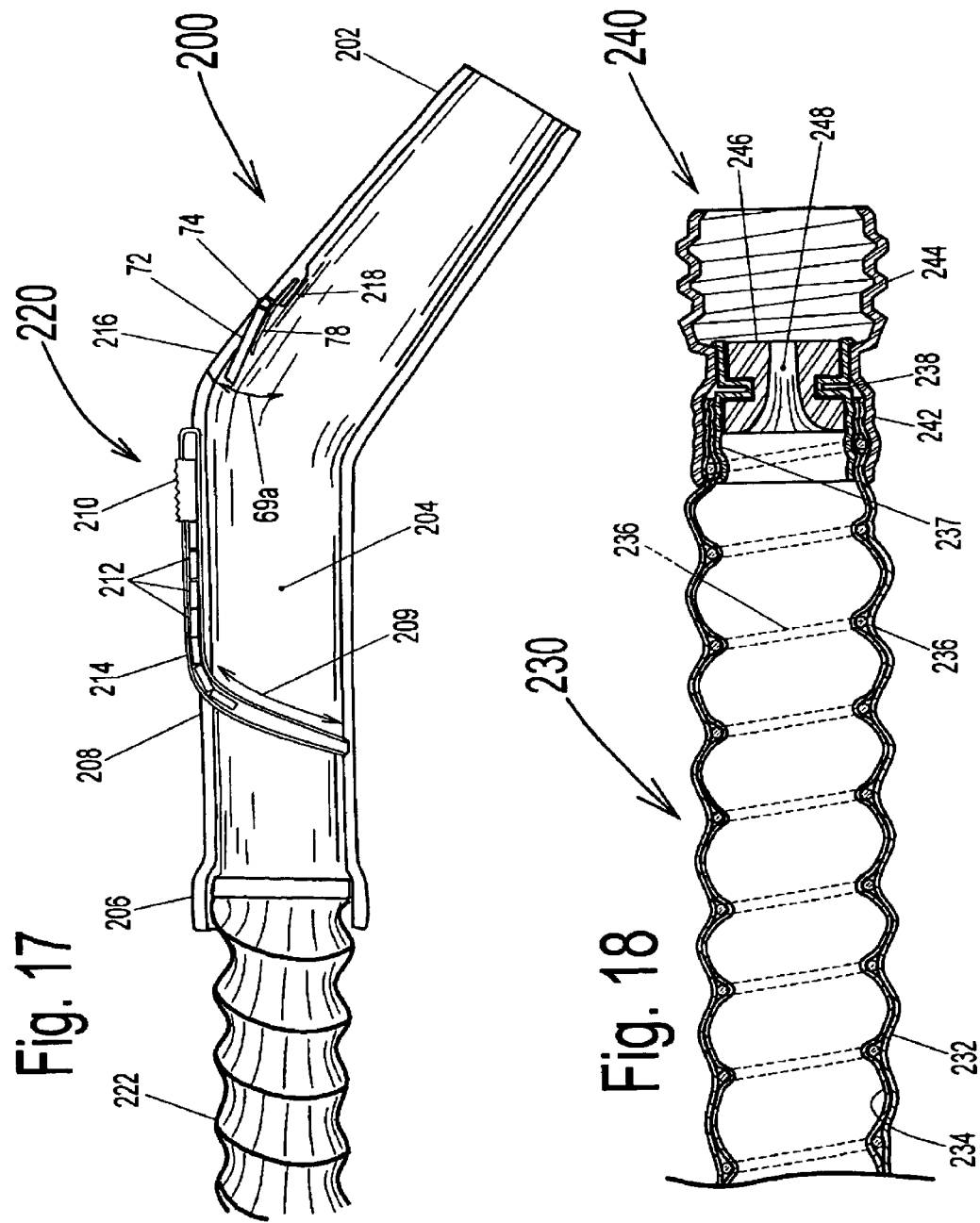

PRESSURE-ACTUATED LINEARLY RETRACTABLE AND EXTENDIBLE HOSE

CROSS-REFERENCE TO RELATED APPLICATIONS

This utility application claims priority from U.S. Provisional application Ser. No. 60/335,497, filed on Nov. 24, 2001.

BACKGROUND

Field of Invention

The field of this invention relates to hoses for carrying fluid materials (i.e. gas, liquid, solid particle mixes) and more specifically for hoses that have a retractable and/or extendable means built into the hose itself.

SUMMARY

The Pressure-Actuated Linearly Retractable and/or Extendable Hose (here after referred to as Linearly Retractable Hose, retractable hose, or hose) disclosed here is a general type of retractable and extendible hose that can be used to carry any fluid (liquid, gas, solid particles, or mixture of the three). To describe the contraction and extension of the hose, the terms "linearly retractable" and "linearly extendible" are used respectfully in this document to describe the longitudinal retraction or longitudinal extension of the hose along its length. This term, "linearly" was used to differentiate the disclosed invention from prior art systems which may retract the length of the hose (in a longitudinal direction), but do not significantly change the hose's fluid flow length itself (hose sections expand and/or contract parallel to fluid flowing through the hose at that section). Thus, the term "linearly" as used here, does not necessarily describe straight-line length changes in the hose, but instead describe length changes along the curved path (longitudinal path) of the hose. The Linearly Retractable Hose can work with both pressure hoses (pressure inside the hose is greater-than ambient pressure outside the hose) and vacuum hoses (pressure inside the hose is less-than the ambient pressure outside the hose). The same general hose structure can be used for both pressure and vacuum hoses with only changes to the bias directions of its integrated spring. The Linearly Retractable Hose has two basic states: 1) an extended state where the hose may be used and 2) a retraced state where the hose is not being used. In both cases, the extending or retracting to either of the states is automatically controlled by adjusting the pressure (above or below ambient pressure) within the hose against the biasing means. The biasing means may comprise a spring positioned along the length of the hose, both to support of the hose radially, and to longitudinally bias the hose against (in the opposite direction of) the internal pressure (above or below ambient pressure) within the hose. In other words, the biasing means pushes longitudinally along the length of the hose, opposite the force created by the pressure differential between the interior and exterior of the hose. Thus, the magnitude of these two forces are opposed to one another.

For vacuum hoses (hose pressure below ambient pressure), the spring would be biased to extend the hose to full length when not experiencing sufficient vacuum pressure internally (within the hose channel) to overcome the spring bias. For pressure hoses (hose pressure above ambient pressure), the spring would be biased to contract to its minimum length when not experiencing sufficient internal pressure to overcome spring bias. A fluid flow restriction device at the working end of these two types of hoses may be used to control the pressure within the hose by restricting the flow through the hose. This control of pressure determines whether the hose can be extended or retracted against the force generated by the biasing spring (or biasing means). For a vacuum hose, a substantial restriction (or closing-off) of the working end of the hose causes vacuum pressure within the hose to increase (lower absolute pressure). This increase in vacuum pressure pushes longitudinally on the ends of the vacuum hose, due to atmospheric pressure, and on its individual coils to compress the hose to its fully retracted position. For a pressure hose, a restriction at the working end of the hose, or along its length, causes the internal pressure within the hose to rise above the outside ambient pressure. This pressure can cause the hose to extend to its full length. The pressure hose is biased to retract when a low pressure difference is present, while the vacuum hose is biased to extend when a low vacuum pressure is present. This biasing allows each hose to utilize the internal pressure (pressure hoses) or vacuum pressure (vacuum hoses) of the fluid within it to control its extending and retracting.

OBJECTIVES AND ADVANTAGES

Accordingly, several objects and advantages of the invention are:

a) To provide a hose that retracts itself to a much smaller length when not in use.

b) To provide a hose that retracts itself to a much smaller volume when not in use.

c) To provide a hose that automatically extends itself for use.

d) To allow control of the hose's extension and retraction by utilizing the pressure differential between the interior and exterior of the hose.

e) To provide automatic retraction force on a hose when the pressure differential between the exterior and interior of the hose is near zero.

f) To provide automatic extension force on a hose when the pressure differential between the exterior and interior of the hose is near zero.

g) To provide a vacuum hose that forcefully extends itself when vacuum pressure is released.

h) To provide a pressure hose that forcefully retracts itself when fluid pressure is shut off.

i) To provide a longitudinal hose retraction method that is built into the hose itself.

j) To provide a longitudinal hose extension method that is built into the hose itself.

k) To provide a longitudinal hose extension and/or retraction method that is built into the hose itself.

l) To provide a hose for extending and retracting linearly along its longitudinal length.

m) To provide a means to activate extending and/or retracting of a hose by controlling the fluid pressure or vacuum within the hose.

n) To provide control of fluid pressure or vacuum within a hose with a control valve (i.e. hand operated valve, electrical switch operated, solenoid controlled, pressure controlled switch, hydraulic motor, pump, etc.) which can close off the hose's air passageway.

o) To provide internal fluid pressure or vacuum by controlling a restriction in the fluid flow near the end of the hose (i.e. hand operated valve, electrical switch operated, solenoid controlled, pressure controlled switch, hydraulic motor, pump, etc.).

p) To allow compact storage of a hose and in much less volume than winding a standard hose on a reel.

q) To provide a vacuum hose with a pressure relief valve to reduce the retraction force on the linearly retractable hose when the end of the hose is sealed off.

r) To provide a pressure relief valve for a vacuum hose wand combined with a means of closing-off the suction passageway so the hose wand can be used with a linearly retractable hose.

s) To provide a vacuum hose wand with a hinged port for excepting objects into the hose wand's air passageway with the hinged port also functioning as a pressure relief valve.

DRAWING FIGURES

FIG. 1A Linearly Retractable Pressure Hose under low internal pressure

FIG. 1B Linearly Retractable Pressure Hose under high internal pressure

FIG. 2A Linearly Retractable Vacuum Hose under high internal vacuum.

FIG. 2B Linearly Retractable Vacuum Hose under low internal vacuum.

FIG. 3A Section view of Linearly Retractable Pressure Hose (extended).

FIG. 3B Section view of Linearly Retractable Pressure Hose (retracted).

FIG. 3C Section view of Linearly Retractable Vacuum Hose (retracted).

FIG. 4 Pressure chart showing key points for Linearly Retractable Hose operation.

FIG. 5 Diagram of typical spring force and retraction ratio for a linearly extendible and retractable PRESSURE hose.

FIG. 6 Diagram of typical spring force and retraction ratio for a linearly extendible and retractable VACUUM hose.

FIG. 7A Alternate Linearly Retractable Hose with variable diameter spring (extended).

FIG. 7B Alternate Linearly Retractable Hose with variable diameter spring (retracted).

FIG. 8A Alternate Linearly Retractable Hose with multiple spring coils (extended).

Figure 8B:
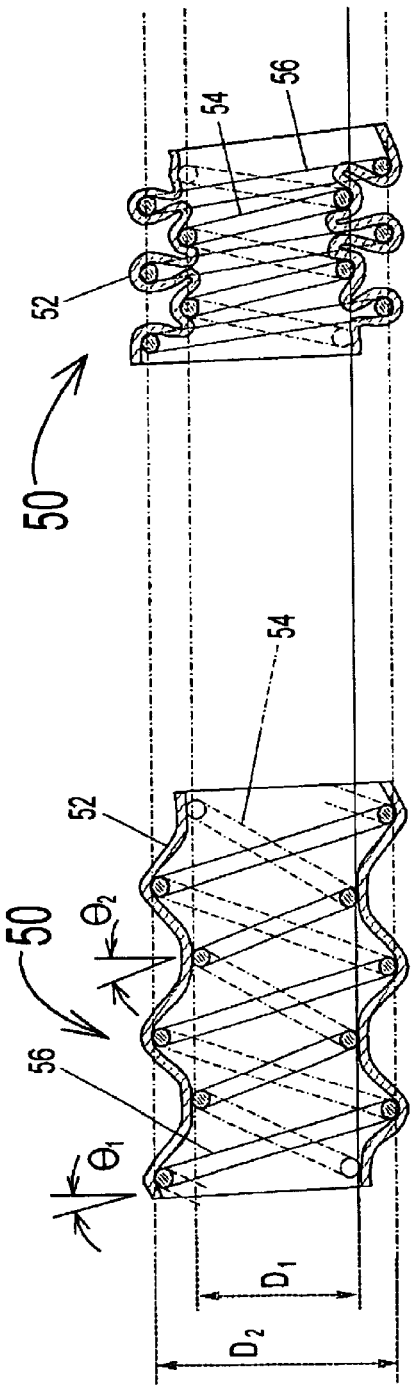

FIG. 8B Alternate Linearly Retractable Hose with multiple spring coils (retracted).

FIG. 9A Linearly Retractable water hose (pressure hose) with water turned off.

FIG. 9B Linearly Retractable water hose (pressure hose) with water turned on.

FIG. 10A Alternate Linearly Retractable Vacuum Hose in retracted position.

FIG. 10B Alternate Linearly Extendible and Retractable Vacuum Hose in extended position.

Figure 11:
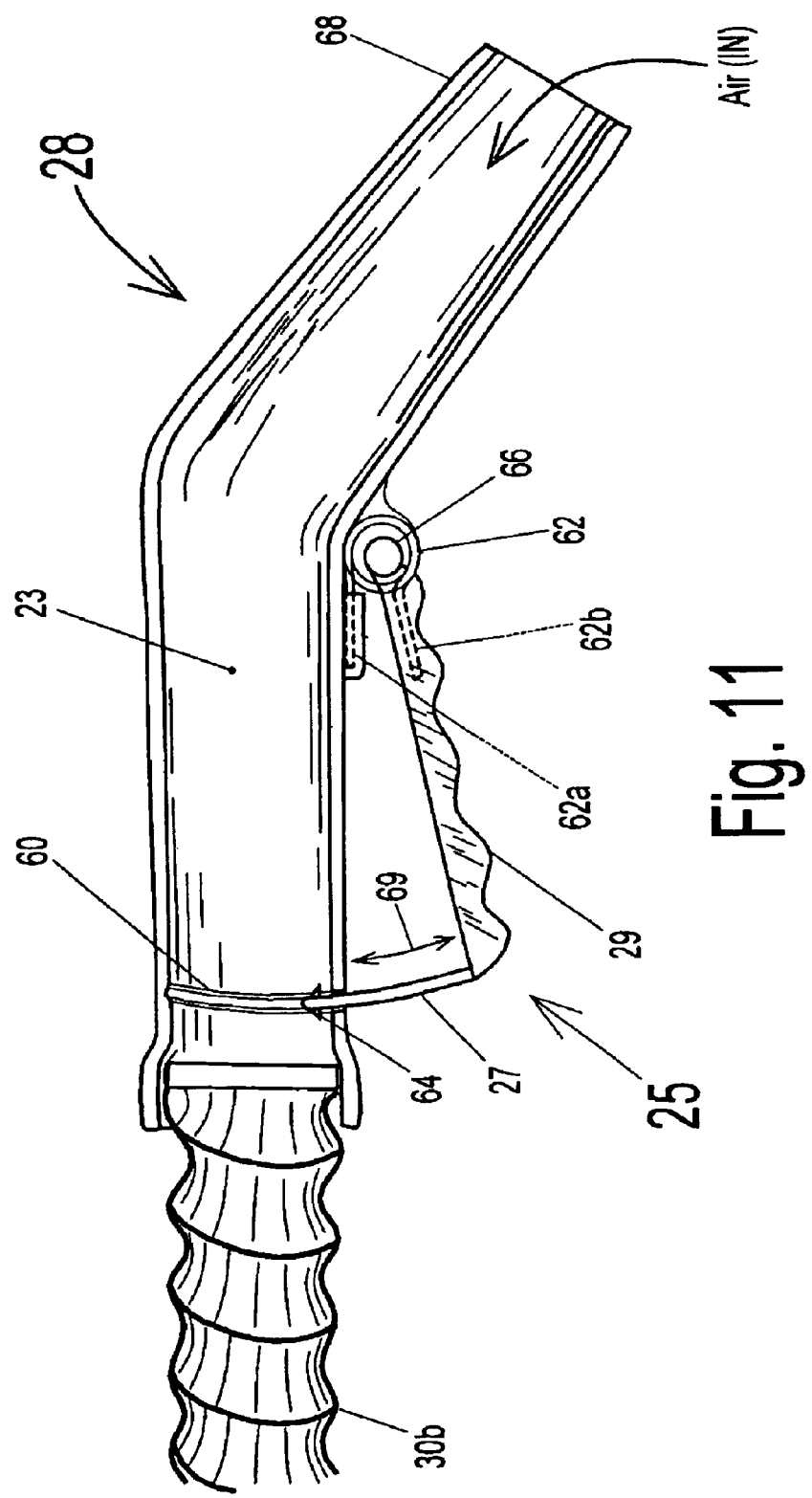

FIG. 11 Side-view of hose wand in FIG. 2A–B.

Figure 12:
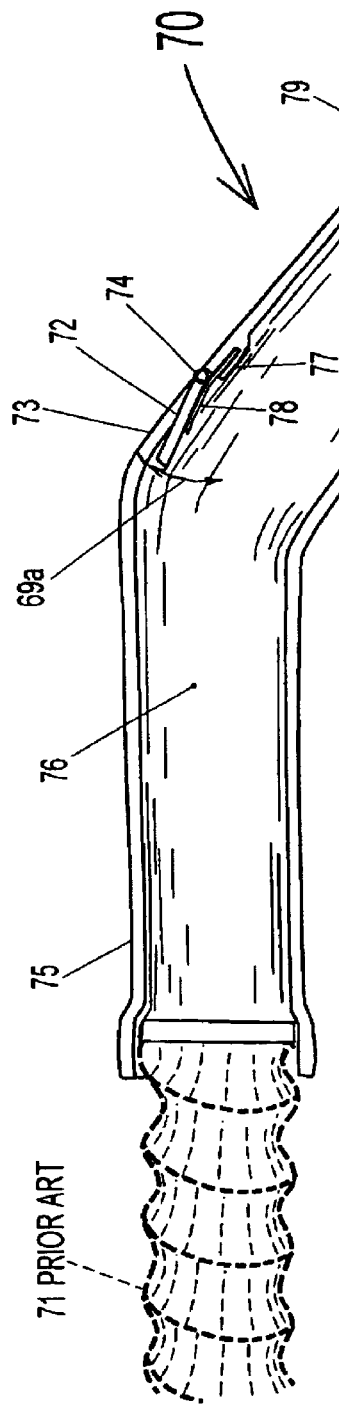

FIG. 12 Side-view of hose wand with pressure relief valve for vacuum hoses.

Figure 13:
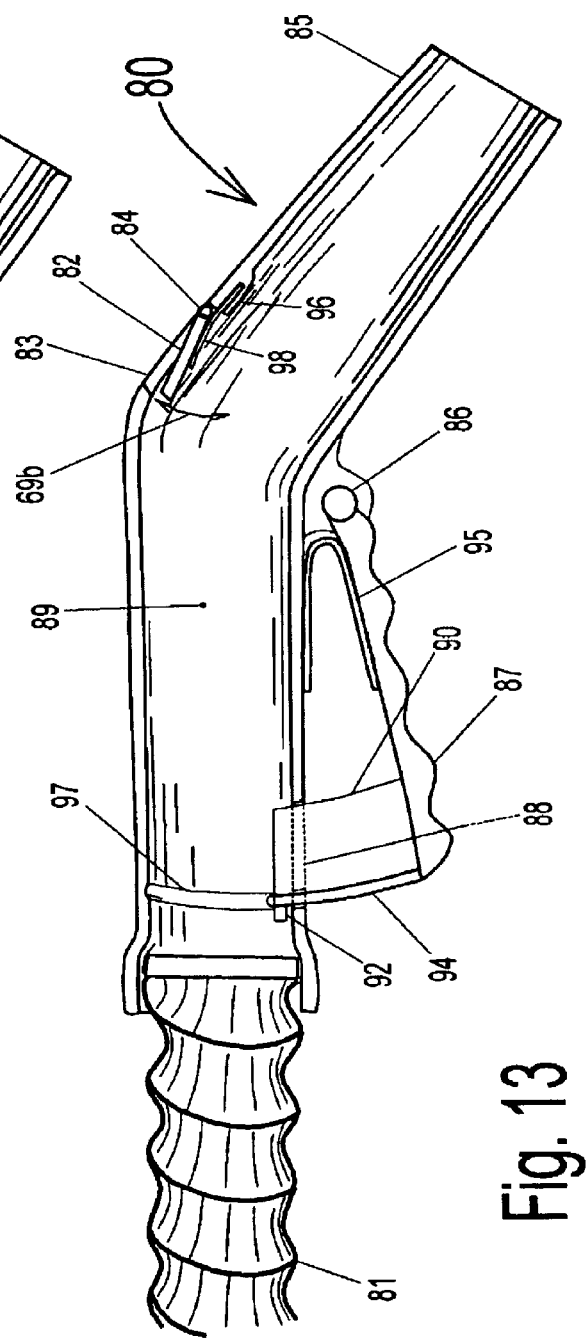

FIG. 13 Side-view of hose wand with separate pressure relief valve and sealing valve for vacuum hoses.

FIG. 14 Side-view of hose wand with separate pressure relief valve and sealing valve for vacuum hoses.

FIG. 15 Perspective view hose wand with combined pressure relief valve and sealing valve.

Figure 16:
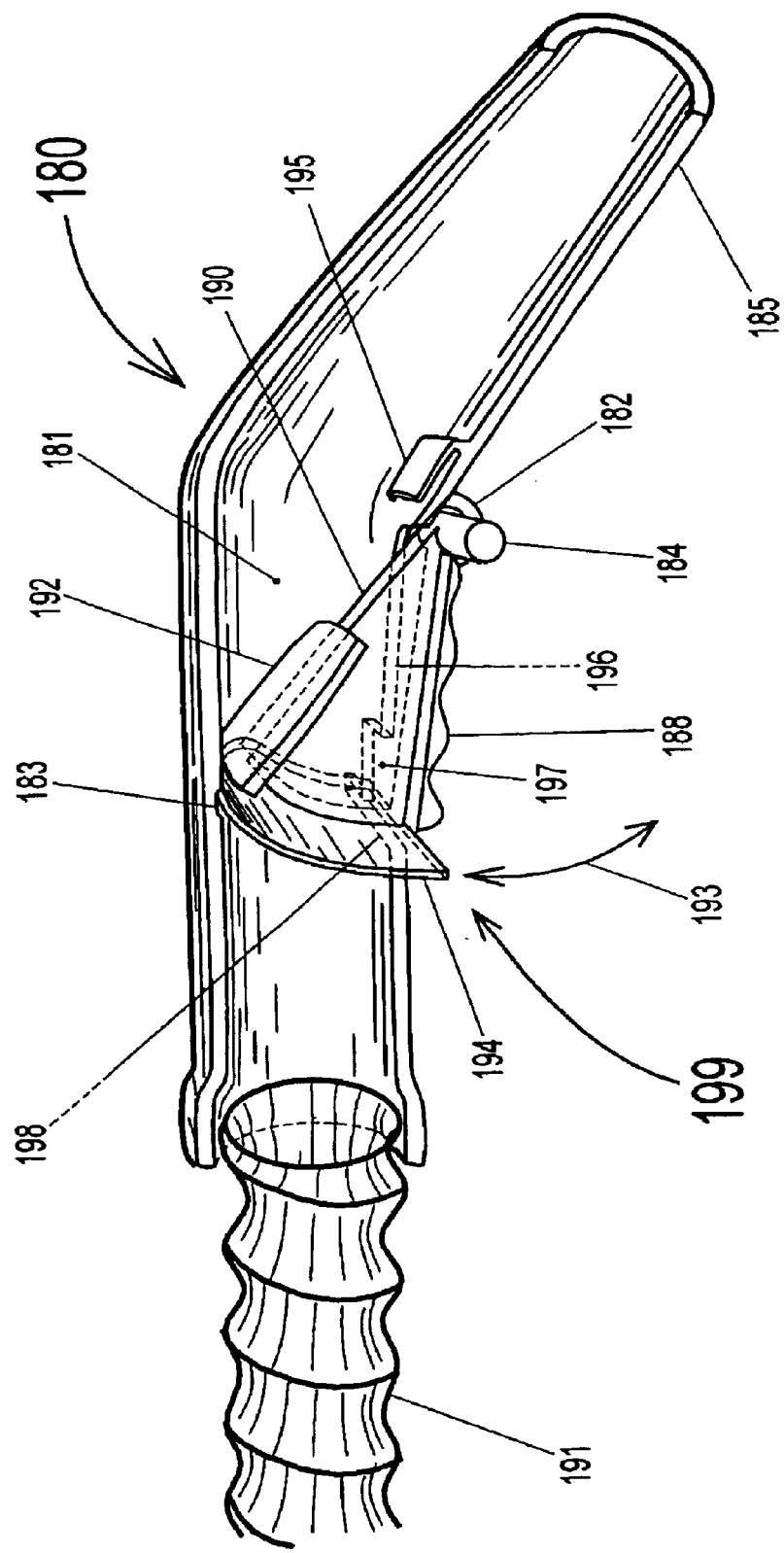

FIG. 16 Perspective view hose wand with combined pressure relief valve and sealing valve.

FIG. 17 side-view of Alternate vacuum hose wand with thumb-operated sealing valve.

FIG. 18 Section view of nozzle end of pressure hose with fluid restriction.

Figure 19:
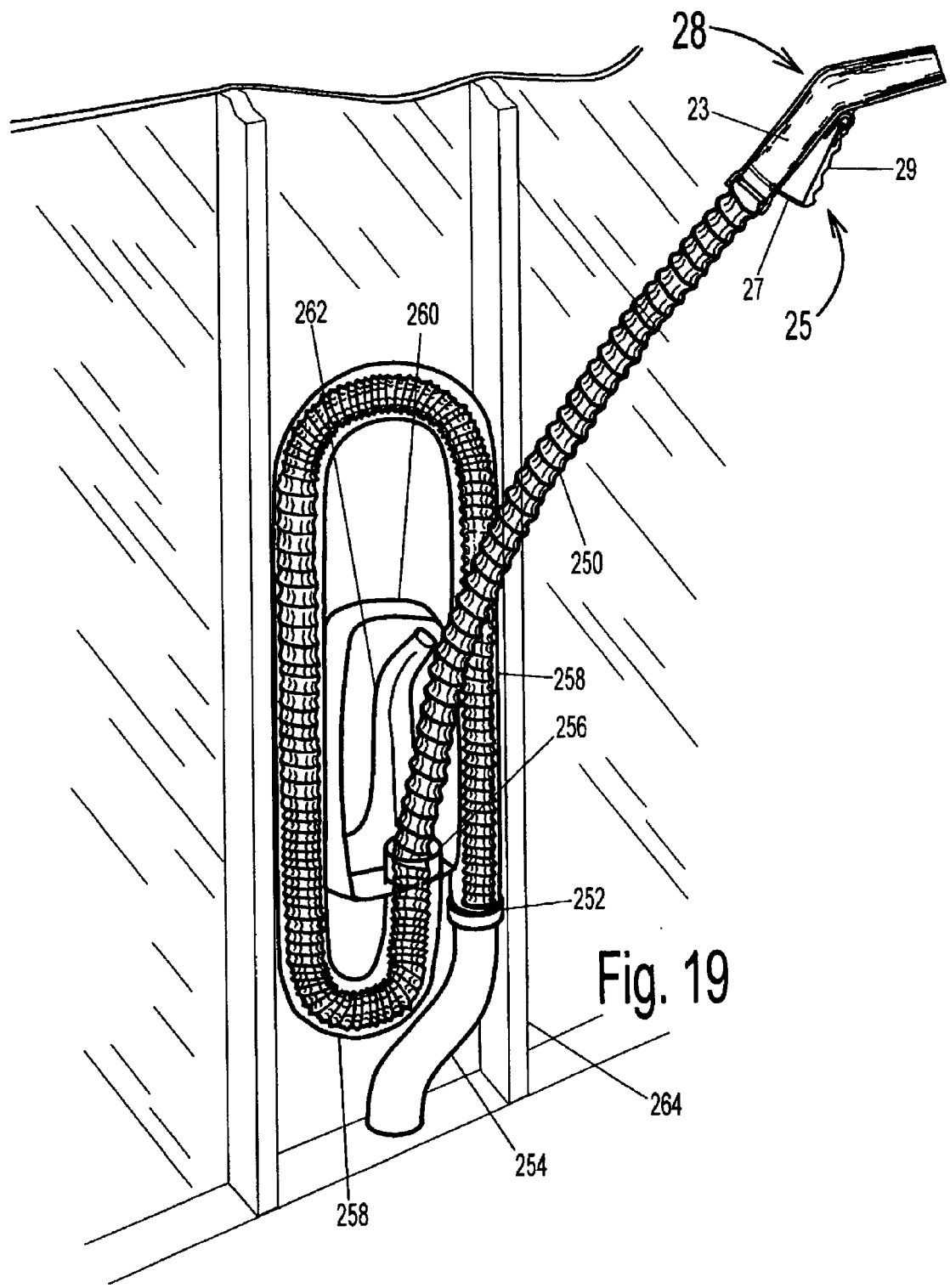

FIG. 19 Perspective view hose wand with combined pressure relief valve and sealing valve.

DETAILED DESCRIPTION OF THE PREFERRED EMBODIMENTS

Hose Construction—(FIGS. 1A–B, 2A–B, 3A–C, 4, 5, 6, 7A–B, and 8A–B)

FIGS. 1A and 1B show a preferred self-extending and self-retracting Linearly Retractable Pressure Hose 30 designed to be a garden hose with a flexible elongated body. Note that hose body 30 in FIGS. 1A and 1B are much shorter than an actual garden hose would be manufactured, but limited space on the page requires the shorter length of hose in order to be able to contrast the hose's retracted and fully extended states. Hose body 30 may be made with a thin-walled flexible material. A source connector 20 can be attached to one end of hose 30 and a nozzle connector 22 may be attached to the other end. Both ends 20 and 22 can be made to match standard garden hose connectors. This allows water to be transported from the source end of the hose to the nozzle connector end. Nozzle connector 22 can be designed to except standard water hose nozzles and sprinklers for standard garden hoses, such as, lawn sprinkler 24. Almost all water nozzles and sprinklers provide significant restrictions in the flow of water through them to increase the pressure within hose 30 sufficiently to cause it to extend as shown in FIG. 1B. The construction of hose 30 will be discussed in more detail during the discussion of FIGS. 3A–B.

FIGS. 2A and 2B show a preferred self-extending and self-retracting vacuum hose body 30b being used as a vacuum cleaner hose. A source connector 26 can be attached to one end of hose 30b and a nozzle connector 28 (hose wand) can be attached to the other end. Source connector 26 can be designed to attach to a vacuum port on a vacuum cleaner for communicate Suction air into hose 30b and ultimately to the end of hose wand body 68. Hose wand 28 can also have a valve mechanism 25 for closing off the suction airflow through hose 30b and hose wand body 68. Hose wand 28 is shown in more detail in FIG. 11.

In FIG. 3A we see a typical Linearly Extendable and Retractable Hose construction in section view cut longitudinally down its center. Hose 30 is specifically designed to be a pressure hose. The construction can be similar to existing hoses except biasing spring 36 is specifically biased for the environment the hose will be used in. A biasing means can be incorporated to bias the hose toward extension or toward retraction. The biasing means can be integrated with the body of the hose or can be internal or external to the body of hose 30. Biasing spring 36 can be a simple helical spring that extends along the full length of the hose, but may be comprised of multiple spring coils and/or multiple diameter spring coils. Spring 36 may be integrated completely with hose 30 as shown in FIGS. 3A and 3B, or may be internal or external to hose 30. For designs with such internal or external biasing mean, the biasing means may only be attached at the ends of hose 30. Similar internal and external construction can be used with other hoses shown in this application. The biasing means can be constructed of multiple wire coils to provide electrical power to the end of the hose, and since nothing rotates on this type of hose the connections can be very simple. In FIG. 3A, helix spring 36 is shown covered with hose cover material 32 on the outside and hose cover material 34 on the inside which provides a flexible elongated body for the hose. This cover material can be molded onto the spring or wound with interlocking strips onto the spring, as is common practice in present day vacuum hose construction (this type of thin wall construction is needed even if the hose is used as a pressure hose).

Alternatively, spring 36 may not be solidly attached to the hose at all, but simply positioned around the hoses exterior surface, or positioned within the hoses interior. Spring 36 can be attached at the hose ends and still provide the needed biasing for the hose designs shown here to operate properly. Vinyls and other polymers may be used for cover materials 32 and 34 to make them thin, but also strong and durable and easy to bond to one another. Cover materials 32 and 34 may be bowed outward between the spring coils as it is molded around the spring coil. This gives the cover material room to move out of the way when the hose retracts and spring coils 36 are forced close together (see FIG. 3B). The biasing of spring 36 is what allows the hose to function as an automatically extending and retracting hose. The biasing of spring 36 depends on the type of use for the hose. For hose 30 which is intended to be used as a pressure hose, spring 36 will need to have a bias that exerts a retracting force on cover materials 32 and 34 and/or connectors (not shown in FIGS. 3A–B) on the ends of the hose. Preferably, the spring would continue this retracting force, even when the hose is in its fully compressed (retracted) state. Bias spring 36, thus, can be a coiled spring that is still providing retracting force even when fully retracted. From this natural retracted state, the spring is stretched before the hose cover materials are placed onto it. Then, when the hose is released, it naturally takes on its fully retracted state. If the hose where to be used as a vacuum hose (see FIG. 3C) then the biasing spring must exert an extending force on the cover material (opposite that for a pressure hose). The spring can continue to exert significant extending force even with the hose is in its fully extended position. The vacuum hose spring is thus an open coiled spring that has been compressed before having the hose cover materials wound around it. The hose must be further compressed to reach its fully retracted position. When the vacuum hose is released it naturally takes on its fully extended state.

FIG. 3B shows hose 30 from FIG. 3A in a partially retracted state. Cover material 34 provides most of the pressure support and may have a mesh of fibers within a more flexible material to help withstand higher pressures. Cover material 32 can be molded on top of spring coils 36 (compression biased spring) and cover material 34 to hold the entire system together. Because this is a pressure hose, materials 32 and 34 arc or bow outward in between the coils of spring 36. This slight outward bow assists the hose in keeping the cover material from getting trapped between the adjacent coils of bias spring 36. When retracted as shown in FIG. 3B, spring 36 can still provide a retracting force on the hose materials 32 and 34. This may assure that the hose can be fully retracted even when some pressure still exists within the hose. FIG. 3B shows hose 30 only partially retracted with further contraction possible until cover material 34 makes contact with itself inside the hose. Ideally, the bias spring would continue to contract the hose until the cover material 34 is stopped by contact with itself. This means the cover materials need to be flexible to allow easy stretching and contracting. Cover material 34 on the inside of the spring coil providing most of the pressure holding ability of the hose. Spring 36 acts as a support structure for hose cover material 34 to keep it from expanding radially too far. Cover material 32 basically provides a cover for the spring and also helps hold cover 34 in place on the spring coils. Cover material 32 can be eliminated if cover material 34 is molded around the spring coils sufficiently that cover 34 maintains its place on the spring. Alternative designs may allow the spring to slide freely with respect to the hose material. The cover material can be designed to expand outward between the coils of the spring (or are molded with this expansion) so that the cover material does not interfere significantly with the spring when the hose is retracted. In other words cover materials 32 and 34 are flexible enough that the hose can expand and contract without large forces generated by the cover materials that resist this expansion and contraction. This also means that the cover materials do not get bunched up between the coils of the spring and stop the full retraction of the hose.

FIG. 3C we see a section view of a vacuum hose 30*b* similar to hose 30 in FIG. 3A, but with a different biasing spring 36*b* and a different molding shape to its covering material. Hose cover materials 32*b* and 34*b* are molded around spring 36*b* similar to hose 30, but to have a slightly inward bow to the space between the coils of spring 36*b*, so that vacuum pressure can easily pull cover materials 32*b* and 34*b* inward between the spring coils. Spring 36*b* in this vacuum hose is biased to expand the hose cover material to its fully extended length. This means that in its compressed position in FIG. 3C, spring 36*b* is under compression forces, with force needed to keep it in this retracted state (the force may come from either vacuum pressure and/or support housing). In its relaxed state, the hose in FIG. 3C can be fully extended and bias spring 36*b* can still be exerting an extension force on the hose cover materials 32*b* and 34*b*. This assures that the hose can be fully extended even if some vacuum pressure exists within the hose.

Spring Bias and Pressure Relationship—FIGS. 4, 5, 6

FIG. 4 shows a graph of the different pressure states for the disclosed linearly retractable hose. For the discussion of the graph in FIG. 4, the term "longitudinal bias force" or simply "bias force" is defined to include both the spring bias and any biasing caused by the flexible cover material that actually defines the hose. In most designs the biasing of the flexible cover material of the hose is designed to be small compared to the biasing caused by the spring. However, in some designs, for special purposes, the cover material may represent a significant portion of the bias force. In fact, if desired, the hose may obtain all its biasing force from the cover material, and not need a separate metal or composite spring at all.

In FIG. 4, when the interior pressure and exterior pressure of the hose are the same (zero gauge pressure), the hose is in what is called its "natural state", where the spring bias determines whether the hose is extended or retracted. This zero gauge pressure is signified by "0 ambient pressure" at the middle of the graph. Pressures to the left of "0" are vacuum pressure (pressure less-than ambient) and pressures to the right of "0" have positive pressure (pressure greater-than ambient). In general, a pressure hose will only experience pressure values to the right of "0" and vacuum hoses will only experience pressures to the left of "0". However, in some applications, pressure fluctuations may extend outside this range for each type of hose.

As pressures within the hose change, the state or mode that the hose is in, also changes. Reading from left to right on the graph in FIG. 4, "Max. Vacuum" represents the lowest pressure obtainable by the vacuum system using the hose. This "Max. Vacuum" vacuum pressure causes the linearly retractable hose to contract to its fully retracted state. The hose tends to remain in its fully retracted state until vacuum pressure is reduced to vacuum pressure $V_2$ where the force exerted by the longitudinal bias force exactly balances the longitudinal force exerted by the pressure $V_2$ on the hose (net longitudinal force equals zero—equilibrium). This equilibrium state, continues as the vacuum pressure is further reduced and the hose extends. The term "vacuum pressure is reduced" means that the "absolute pressure" is increased, that is, less vacuum pressure means more absolute pressure. In practice, viscose fluids flowing through the hose will produce different pressures within different sections of the same hose, due to restrictions (friction). Thus, one section of the hose may be above pressure $V_2$, while at the same time, another section of the hose can be below pressure $V_2$. Thus, some sections of the hose may be extending while other sections are still retracted. As vacuum pressure is further reduced, the vacuum hose begins to extend until a pressure $V_1$ is reached. Between pressures $V_2$ and $V_1$, bias force can exactly cancel the force due to vacuum pressure on the hose if no external forces are applied to the hose. When the entire length of hose reaches pressure $V_1$, or less, the hose is considered fully extended. The hose cover material may be designed so that pressure changes between $V_1$ and "0" have very little effect on the length of the hose because further extension can be limited by the tension in the cover material. Below vacuum pressure $V_1$, the bias force on the vacuum hose over-powers the forces generated by vacuum pressure and the vacuum hose remains fully extended due to the bias force. At "0" gauge pressure, the vacuum hose will be fully extended with substantial force exerted by the bias spring force. Also at "0" gauge pressure, a pressure hose is fully retracted due to its biasing spring (opposite the vacuum hose biasing spring). The pressure hose remains retracted until pressure within the hose increases to gauge pressure $P_1$. At a pressure of $P_1$, the pressure hose is still fully retracted (net longitudinal force negative, trying to retract hose), but the force exerted by the bias force exactly cancels the force exerted by the internal pressure $P_1$. As the hose gauge pressure increases from $P_1$ to $P_2$, the pressure hose extends and reaches its full length at a pressure of $P_2$. Again, if fluid is flowing through the hose, restrictions in the hose (fluid friction) may result in significant differences in pressure at different sections of the hose. At the pressure of $P_2$ the bias force still exactly matches the pressure force (net longitudinal force equals zero), but it can be now fully extended. Above pressure $P_2$ (net longitudinal force positive—tending to extend hose) the pressure hose remains fully extended and cannot extend significantly further because it is restrained by the hose cover material itself. Thus, the hose maintains substantially its fully extended length between pressure $P_2$ and up to its "Max. pressure" which is the maximum pressure the hose can withstand.

In FIG. 5 we see hose 30 from FIG. 3A in a graph showing how spring tension and the expansion length of the pressure hose relate. The values shown in FIG. 5 are just for example and nearly any values can be obtained by proper selection of biasing spring and hose cover material design. At the top of the graph we see spring 36 in its "natural state" uncompressed state, that is, no external forces exerted on it. Below the "Uncompressed Spring 36" in FIG. 5, we see Hose 30 in its fully retracted state (natural state). Notice that hose 30 is considerably longer than spring 36, this added length is due to two thicknesses of cover material 34 between each coil in spring 36 which limits how far spring 36 can contract. Also, notice on the "Spring Tension" bar, that spring 36 actually provides negative one pound of contracting force (compression force) even when hose 30 is fully retracted. The negative sign signifies that the bias force is trying to compress the hose. Below hose 30 in its fully retracted state is hose 30 shown in its fully extended state. On the "Spring Tension" bar we see that seven pounds of force are needed to overcome the spring tension when fully extended. This does not take into account any additional biasing forces that may be caused by the hose cover material. Notice that the force generated by the spring increases linearly, which is typical for simple springs. The "Length Expansion Ratio" bar shows the different expansion ratios for pressure hose 30 normalized to the natural retracted length of spring 36. From this graph, we see that seven pounds of pressure force on the ends of hose 30 is needed to overcome spring bias (bias force) when fully extended. These forces are relatively easy to obtain with a typical household water faucet that usually has a working pressure between 40 and 80 pounds per square inch (psi). Thus, for a hose with close to a one square inch cross-section, only a small fraction of the actual water pressure may be needed to forcefully extend hose 30 and keep it fully extended while in use. A typical spray nozzle will provide sufficient restriction in the water flow to provide sufficient pressure to extend the hose. For areas with low water pressure lighter bias springs may be needed. Spring 36 may be designed with a pre-stressed structure so that at the uncompressed length the spring experiences minus three pounds (−3 lbs.) of force instead of the minus zero pounds (−0 lb) shown in FIG. 5. By using such a pre-stressed spring, the fully retracted hose may then have minus 4 pounds of force instead of "−1 lb" and minus 10 pounds of force when fully extended instead of "−7 lb". The biasing spring may also be adjusted by other means, such as, using a different "spring constant (k)" for the spring, to provide the desired range of forces for a specific application.

In FIG. 6 we see vacuum hose 30b from FIG. 3C in a graph showing how spring tension and compression ratio relate to vacuum hose operation. At the top of FIG. 6 we see spring 36b in its "natural" uncompressed state. Once molded into hose 30b, spring 36b is compressed to about one-half its natural length (this compression ratio was selected arbitrarily). Thus, spring 36b can be compressed within hose 30b even when the hose is fully extended. In this fully extended state hose 30b may have one-half the original length of spring 36b. In this compressed state, spring 36b exerts a 2.4 pound force longitudinally outward along the hose. As the hose is further compressed, the spring tension increases to 4.0 pounds when fully retracted. For this example, when vacuum hose 30b is fully retracted, it has a length one-third its fully extended length and one-sixth the original length of spring 36b. Notice that spring 36b increases linearly as it is compressed. Thus, the hose remains extended even under 2.4 pounds of compressive force ($V_1$) generated by vacuum pressure. When vacuum force increases to 4.0 pounds ($V_2$) as the vacuum hose contracts to its fully retracted position. After fully compressed, hose 30b cannot retract any more because of physical material within the hose stopping it (i.e. spring 36b and cover 32b), so additional vacuum pressure greater-than $V_2$ does not significantly change the hose length. Notice that even though 2.4 pounds of force are needed to start hose 30b retracting, only 1.6 more pounds of force are needed to put the hose in a fully retracted state. It is the initial compression of spring 36b that allows relatively large vacuum pressures to not effect hose length and for small additional changes in vacuum pressure to fully contract the hose. The biasing forces may be adjusted over a wide range of properties while still allowing the hose to operate. The biasing force can be tailored to provide a wide range of vacuum pressure where the hose is fully extended, while at the same time not creating such a strong bias force that the hose cannot fully retract with the available "Max.Vacuum". By adjusting the springs "spring constant" and/or its initial compression ratio when fully extended, one can control the value of pressures $V_1$ and $V_2$.

Alternate Hose Designs—FIGS. 7A–B, and 8A–B

In FIGS. 7A and 7B we see a section view of an alternative hose design. In this design, a bias spring 44 has a variable diameter with a flexible elongated hose cover 42 molded around it. Spring 44 varies between a diameter of $D_1$ and $D_2$, oscillating between the two diameters along the length of the hose. This gives the hose a slightly spiral look to it even though the spring's coils are in-line. When the hose is compressed, a greater compression ratio is possible than with a straight coiled spring because the smaller diameter coils $44D_1$ can fit inside the larger diameter coils $44D_2$ as seen in FIG. 7B. The thickness of hose cover 42 is greatly exaggerated here to show detail. Also an inner cover is not shown for the same reason, but may have a structure similar to cover 34b in FIG. 3C.

In FIGS. 8A and 8B we see a section view of another alternative hose design. In this design, two bias springs are used, spring 54 with a diameter $D_1$ and spring 56 with a diameter $D_2$. This two spring design may allow greater compression ratios, like hose 40 in FIGS. 7A–B. The coils of springs 54 and 56 are alternated along the length of hose 50 so that the hose cover material 52 alternates between a diameter of $D_1$ and $D_2$ along a spiral path. Because the coils of springs 54 and 56 alternate they require twice the $\theta_1$ angle as hose 40 for the same absolute coil spacing. This limits how large the compression ratio of the hose can be because as $\theta_1$ gets larger, the amount of stretching needed on covers 52 and 42 increases. Thus, hose 50 can only have about one-half the extended length of hose 40 with the same number of spring coils. Because spring 54 has a smaller diameter than spring 56, angle $\theta_2$ is larger than angle $\theta_1$. The thickness and stiffness of cover material 52, and the way it folds as the hose retracts is key to getting the maximum ratio of extended to retracted lengths. If two or more conductors are needed, such as to supply electrical power to the end of the hose, a single biasing coil may be used which has multiple conductors in it. For example, the hose shown in prior art U.S. Pat. No. 5,555,915.

Cover materials 42 and 52 could also be placed inside the spring coils of their respective hose to make it usable as a pressure hose. In this case, the folds of the cover material would bow outward between the spring coils when the hose was retracted. The use of a multiple diameter spring coil would again allow greater compression ratios for the hoses if designed properly.

Vacuum Hose Wand and Pressure Release—FIGS. 10 Thought 17

FIG. 10A and 10B shows Linearly Retractable Vacuum Hose 110 slidably attached at locking ring 122 to vacuum cleaner hose wand 120 (support structure). Hose 110 comprises source connector 112, flexible elongated hose 114, and locking ring 122 to provide a continuous air channel between connectors 112 and 114. Hose wand 120 comprises, hose wand body 129, valve 126 (valve means), handle 124, air passageway 128, hose extension 116 and locking end 118. Source connector 112 and locking ring 122 are attached and sealed to hose 114 at opposite ends. Source connector 112 can be designed to removably attach to vacuum air suction port 134 which receive air suction from a vacuum cleaner through vacuum hose 136. For this design, source connector 112 snap locks into place within port 134 to provide a relatively air-tight seal, however, many other locking mechanisms would also work. Hose extension 116 has a locking end 118 on one end, and hose wand housing 129 on the other. A pivot joint may be added between hose wand body 129 and hose extension 116 to provide better usability. Handle 124 on body 129 can be used to move valve 126 between open and closed positions, wherein valve 126 may close-off airflow through passageway 128. Handle 124 may be spring-loaded so that valve 126 automatically opens when the user releases handle 124. Hose wand 120 can be connected to Linearly Retractable hose 110 by locking ring 122. Hose extension 116 is longitudinally slidable within locking ring 122 and can be moved between a retracted position shown in FIG. 10A and an extended position shown in FIG. 10B. In both positions, locking ring 122 may be twisted to prevent hose extension 116 from sliding. The extension and retraction of Linearly Retractable Hose 114 may be designed to be independent of the extension and retraction of hose extension 116 in this design, but may act together in some designs if desired. With both hoses 114 and 116 in there retracted positions (see FIG. 10A), locking end 118 on the end of hose extension 116 may be twist locked into a receiving port on the inside of source connector 112, thereby removably connecting hose extension 116 to source connector 112. Hose extension 116 may alternatively form a tube around Linearly Retractable Hose 114 instead of down its interior air channel. This alternative exterior hose extension would have a locking end that attaches to the outside of source connector 112 instead of the inside. Both designs would allow hose 114 to be held in a compressed state with air suction turned off.

FIG. 11 shows a close-up of hose wand 28 from FIGS. 2A and 2B. In FIG. 11 we see more clearly, that valve mechanism 25 comprises a handle 29, a sliding valve 27 (airflow control valve), a pivot hinge 66 and a biasing spring 62. Hose wand 28 may be made of a high-impact plastic, but could also be made of stamped metal or other material and combinations. Spring 62 may be a spring steel torsional spring with two ends 62a and 62b which are designed to keep sliding valve 27 in the open position (as seen in FIGS. 2B and 11) during normal operation. Spring ends 62a and 62b press on hose wand body 68 and handle 29 respectfully to provide this biasing. A stop 64 keeps the sliding valve from sliding out of hose wand body 68, and sliding valve guide slot 60 keeps the sliding valve aligned within the hose wand as it move in and out of the interior of hose air passageway 23. Valve mechanism 25, in this preferred design, allows sliding valve 27 to close-off air passageway 23 to significantly increase vacuum pressure on the hose. To close-off air passageway 23, the user presses on handle 29, forcing valve 27 along guides 60 into passageway 23 as seen in FIG. 2A. This effectively blocks suction air to the end of hose wand body 68 and substantially stops airflow through hose 30b. Sliding valve 27 has the added advantage of sliding perpendicular to the vacuum pressure so that vacuum force generates very little force in the direction of motion of valve 27. This makes it relatively easy for the user to close the valve 27 since less force is needed on handle 29 to close off passageway 23. Hose wand body 68 and valve mechanism 25 may be made of injection molded plastic.

In FIG. 12 we show a standard prior art vacuum hose 71 with a wand 70 having a pressure relief valve 72 added. Hose 71 may comprise any of a number of standard extendible vacuum hose designs on the market, which are compressible and extendible along their length. These types of hoses are use in upright vacuums where a retractable spring-biased hose allows storage in a small space (note this biasing is the opposite of the disclosed Linearly retractable Vacuum Hose). Pressure relief valve 72 provides added function to standard extendible hose 71 by limiting the vacuum pressure that tends to pull hose 71 toward a retracted position (adds to the already existing spring bias force). Hose wand 70 comprises a body section 75, with an air channel 76 passing through it from hose 71 to wand end 79. Mounted on body 75 is pressure relief valve 72 which can be designed to open valve port 73 by pivoting on hinge 74. Valve 72 has a range of motion shown by arrow 69*a*. When vacuum pressure inside air passageway 76 increases above a preset vacuum pressure value, valve 72 begins to open. This preset vacuum pressure value can be determined by the size of valve 72 and spring clip 78 mounted in slot 77 on the inside of wand body 79. The other end of spring clip 78 presses up against the inside of valve 72 and keeps valve 72 forced against valve port 73 to seal off air. Spring clip 72 can be designed with the proper tension so valve 72 rarely opens during normal use, but may open nearly completely if the end of hose wand body 79 can be completely blocked from air flowing. Many other standard types of valves can be used for valve 72 provided they can open automatically and sufficiently to keep vacuum pressure within passageway 76 below the desired value.

In FIG. 13 we see a vacuum hose wand 80 designed for a Linearly Retractable Vacuum Hose 81 which is similar to hoses seen in FIGS. 2A–B, 3C, 7A–B, 8A–B and 10A–B. Relief valve 82 can be biased with spring clip 98 which can be held in place by support 96 that is molded into hose wand body 85. Valve 82 has a similar range of rotation 69*b* about hinge 84 that valve 72 has in FIG. 12. Pressure relief valve 82 blocks port 83 to close off air from passing through port 83 until a predetermined (preset) vacuum pressure is reached. This predetermined vacuum pressure can be controlled by the selection of spring clip 98 bias and the shape and area size of valve 82. These parameters are adjusted so that relief valve 82 may open when a vacuum pressure inside air passageway 89 is near the vacuum pressure ($V_1$) needed to begin retracting hose 81. Hinge 84 along with spring 98, may keep valve 82 closed over port 83 until this near ($V_1$) vacuum pressure is reached. Greater vacuum pressure can cause control valve 82 to begin opening and to bleed air into the hose wand and thus limit vacuum pressure increase, which in turn limits the retracting of hose 81. Lower vacuum pressures (higher absolute pressure), valve 82 remains closed and suction air mostly flows into hose 81 and wand 80 though the end of body 85. One should note that the vacuum pressure where hose 81 just begins to retract is simply one pressure value within a range of pressures that would work for this type of pressure relief valve. The actual selected preset pressure value would depend on the specific use for hose wand 80. Hose wand 80 also has an airflow control valve 94 and handle 87 similar to that seen in FIG. 11, accept that valve 94 does not require a guide slot 97 to support it because support 90 braces control valve 94 against vacuum forces when air passageway 89 is closed-off. Slot 97 is still shown here in FIG. 13, as the slot can be used to provide a better sealing surface for valve 94. Stop 92 prevents control valve 94 from opening too far and exiting hose wand body 85. Stop 92, support 90, control valve 94 and handle 87 may be molded from a single piece of polymer plastic. A slot 88 in hose wand body 85 can be made to seal against the surfaces of control valve 94 and support 90 as they move in and out of air passageway 89. Slot 88 can have a gasket material along its edges to help seal vacuum air from flowing between the interface of slot 88 and plastic surfaces of 90 and 94. Slot 88 could use a felt guide or rubber gasket lining its inside, which would be sufficient to restrict airflow through the interface. A hinge 86 keeps control valve 94 open until the user squeezes handle 87 to close the valve. Many standard ways exist for spring biasing the hinges for handle 87 and valve 82. In this design a spring clip 95 can be used to force handle 87 away from body 85. Airflow control valve 94 can be placed between the suction air source (hose 81) and relief valve 82. This can be done so that control valve 94 can substantially close-off suction air from passing through hose wand 80 to hose 81 and thus, create "Max. Vacuum" (see FIG. 4) to retract hose 81.

In FIG. 14 we see a section view of an alternate hose wand 160 with a pressure relief valve 142 similar to pressure relief valve 82. In this design a different sealing mechanism 146 can be used which comprises spring-loaded hinge 147, spring clip 156, handle 148, and sealing valve plate 149. Handle 148 and valve 149 are molded out of a single piece of plastic and attached to hose wand body 145 at hinge 147. Body 145 would preferably be made of two injection molded parts that are bonded together along the plane of the paper and thereby secure sealing mechanism 146 and release valve 142 in place at hinge 147 and 144 respectfully. Valve plate 149 can rotate between its shown open position and closed position 149*a*. Valve plate 149 rotates about hinge 147 to make this transition. Spring clip 156 can be biased to keep valve plate 149 in its open position (as shown) until the user presses handle 148. The surfaces comprising handle 148 are kept sealed from airflow by a sealing gasket 159 which can be attached to hose wand body 145 and keeps air from passing between handle 148 and body 145. Sealing gasket 159 forms a hole in body 145 to allow handle to move valve 149 in and out from its open and closed positions without substantial amounts of air leaking into channel 151. Similarly, relief valve 142 has spring clip 154 biased to keep it closed until sufficient vacuum pressure on valve 142 causes it to open. Valve 142 seats against hole 143 to prevent air from entering the hose wand channel 151 unintentionally. An additional gasket may be used as an interface between hole 143 and valve 142, but such small plastic valves can be relatively easy to get to seal sufficiently for this application.

In FIG. 15 we see a perspective view of vacuum hose wand 160 with the front half of hose wand body 165 removed to show the interior (note the other hose wands in FIGS. 12 through 16 are similarly constructed). Hose wand body 165 may be constructed of two halves which are mirror images of each other as seen in FIG. 15 (only the rear half shown). A Linearly Retractable Vacuum Hose 171 is attached to the rear of hose wand body 165 and its hollow interior allows air to be conducted from one end of body 165 to the other. For the design in FIG. 15 then entire hose wand would be made of four separate plastic parts which include a two piece hose wand body 165, polymer spring 167, and control mechanism 176. Hose wand body 165 would comprise two halves each mirror images of the other. Tabs and slots (not shown) would be molded into the joining edges of body 165 so that the two halves could be easily aligned for bonding. In this design body 165 has the following features molded into it: pivot support 166, guide slot 177 and relief valve port 164. Control mechanism 176 can be a single molded plastic part in this design, and comprises several distinct features molded into it. These features include: handle 168, pivot knob 178, sliding valve 174, support rib 170, and relief valve/stop 172. Pivot knob 178 can fit into pivot supports 166 on each half of wand body 165 to allow mechanism 176 to pivot about that axis. Spring 167 can be an elastic polymer, or rubber covered steel spring, bonded to handle 168 and hose body 165 to hold it in place. Polymer spring 167 used here instead of a standard spring clips just to show an alternative way to provide a bias force for keeping valve 172 closed over port 164. Many other methods can be used to bias valve mechanism 176. The polymer spring 167 is biased so that handle 168 wants to spring outward away from wand body 165 with sliding valve 174 substantially open and outside wand body 165. Valve mechanism 176 can be placed in between the two halves of body 165 when the body is put together, thus holding it in place. A relief valve port 164 formed by the two haves of body 165 when bonded together and designed to bleed air into channel 162 when needed. This valve port 164, allows sliding valve 174 and support 170 to move freely in and out of body 165. Relief valve/stop 172 prevents the sliding valve 174 from sliding completely out of the hose wand body, and also seals relief valve port 164 when handle 168 is released by the user. Spring 167 has the proper biasing so that excess vacuum pressure within air passageway 162 causes relief valve/stop 172 to lift slightly off its sealing surface port 164. This bleeds air into air passageway 151 and reduces excess vacuum pressure. Valve port 164 should be made of sufficient size, so that sufficient air can be bled into air passageway 162 to reduce vacuum pressure to the desired value to reduce unintentional retracting of hose 171.

In FIG. 16 we see a perspective view of vacuum hose wand 180 with the front section of hose wand body 185 removed to show the interior. Hose wand body 185 can be constructed of two halves which are mirror images of each other (only the rear half shown). The basic design of hose wand 180 can be the same as hose wand 160, but with a shortened handle 188 and port opening 196, 197, 198. Hose wand 180, similarly, combines a pressure relief valve 192 in its control valve mechanism 199. Combining the vacuum pressure relief function with the valve control mechanism reduces control mechanism 199 to a single movable piece of plastic, thus simplifying construction and reducing cost. Hose wand 180 can be attached to Linearly Retractable Vacuum Hose 191 using standard hose bonding methods. Hose 191 may comprise any of the Linearly Retractable Vacuum Hose designs shown here in this document. Mechanism 199 comprises hinge knobs 184, a handle 188, a support rib 190, a relief valve/stop 192, and a sliding control valve 194. Support rib 190 helps support control valve 194 and relief valve 192 against vacuum pressure. On the bottom portion of valve 194 and support 190 is attached handle 188 for the user to grip. Pressing in handle 188 causes control valve 194 to move perpendicular to the suction airflow along path 193 and close off air passageway 181 as shown in FIG. 16. Because valve 194 closes perpendicular to the suction force, very little force can be transferred to handle 188 against the user's hand as vacuum pressure build-up behind the closing valve. This makes it much easier for the user to close valve 194 with handle 188, than to press valve 149 in FIG. 14, which must close against vacuum pressure (position 149*a*). Relief valve port 197 in wand body 185 can be designed to begin bleeding air into air passageway 181 when the vacuum pressure within the wand increases above a predetermined maximum. Handle 188 can be biased similarly to handles shown in FIG. 14 or 15 to keep relief valve 192 closed over valve port 197 when vacuum pressure is below this predetermined maximum. Valve port 197 can be placed on the side of control valve 194 away from the suction supply. This is to allow control valve 194 to close-off all air entering the hose wand when handle 188 is completely depressed as shown in FIG. 16. Port opening 196 in body 185 seals around support 190, and port opening 198 seals around valve 194 to allow support 190 and valve 194 to move freely in and out of hose wand body 185 while keeping air from leaking into air passageway 181.

FIG. 17 shows another way valve control may be achieved with hose wand 200 attached to Linearly Retractable hose 222. Note that only the left-half of hose wand 200 is shown, the right-half (not shown) is the mirror image of the left-half. Hose 222 is attached at connector 206 molded into the body of wand 200. Connector 206 may be designed to rotate about the axis of hose 222 to allow the hose wand 200 to rotate with respect to hose 222. Passageway 204 allows air to be sucked into wand end 202, passed valve 220 and into hose 222. Relief valve 72 can be the same as shown on hose wand 70 in FIG. 12. Body 202 provides spring support 218 to hold spring 78 and valve opening 216 for valve 72 to seal against. Sealing valve assembly 220 can also be placed on hose wand 200, which comprises guide notch 214, sliding valve segments 212, thumb control 210, and rectangular shaped valve housing molded into hose wand body 202. Slide valve 212 comprises several linked segments made of a flexible polymer (such as Polypropylene) which can be designed to slide within channel 214 to close off air passageway 204. Arrow 209 shows the range of motion for the end of linked segments 212. Thumb control 210 is shown slightly to the left of its fully open position within channel 214, and segments 212 are just starting to block air passageway 204. Wand body 202 has a rectangular shape at valve housing 208 to allow channel 214 to maintain an equal distance from its corresponding channel on the right-side of the housing (removed, not shown).

Water Hose End Design—FIG. 18

In FIG. 18 we see hose 230 with Linearly Retractable Water Hose nozzle end 240. Hose 230 and nozzle end 240 have been sectioned along their mid-section to show the cross-section of their components. Hose 230 can be designed similarly to the other designs within this patent, with a coiled biasing spring 236, inner cover 234, and outer cover 232. Spring 236 may comprise any of a number of resilient materials, such as, spring steel, composites, etc. On the end of hose 230 is mounted nozzle end 240, which can be designed with standard garden hose threads 244. Nozzle end 240 comprises an inner crimp ring 237, an outer crimp ring 242 which also provides threads 244, and water restriction ring 246. Hose 230 can be trapped between crimp rings 237 and 242 to provide a compression fit that is water tight and secure. Additional bonding materials may be used between the two crimp rings to insure a watertight connection between hose 230 and nozzle end 240. Crimp rings 242 and 237 are also crimped onto each other so that they form a rigid unit that will not fall apart during use. Crimp ring 237 also has a circular ridge 238 crimped radially inward to provide support for restriction ring 246. Alternatively, a restriction ring 246 may be placed over circular ridge 238 to provide this restriction as shown in FIG. 18. Channel 248 through the center of restriction ring 246 (or just the circular ridge 238, can be designed to restrict water flow just enough for pressure to increase within hose 230 sufficient to fully extend it. Thus, hose 230 will extend fully when water is turned on, even without a sprinkler, nozzle or other garden watering device to provide the restriction. Care must be taken to not overly restrict water flow so that insufficient water flow remains to supply garden watering devices. Restriction may also be accomplished with a twist-on extension which can be screwed onto nozzle connector 244 to provide restriction in water flow, or removed to provide full water flow to a sprinkler or the like.

Note that the use of a separate restriction ring 246 is optional since circular ridge 238 may be made with a small enough opening to sufficiently restrict water flow through the hose. Notice that even without restriction ring 246 or ridge 238, water is restricted by hose 230 itself. The oscillating diameter of the hose, can cause turbulence in the flowing fluid which creates hydraulic friction that resists the flow of the fluid. Even a smooth hose will experience a significant pressure drop when flowing. Thus, spring 236 may be made soft enough, and cover layers 232 and 234 flexible enough, that the walls of the hose provide sufficient water friction to extend hose 230. Since this type of hydraulic friction would be spread along the length of the hose, not just near the end, more extension force is experienced by the spring near its source end than the nozzle end. Thus, the biasing spring can be made with a decreasing spring tension so that friction of water against the hose can extend it. Such a graduated spring may also be used on other hose designs. The more flexible cover layers 232 and 234 are, the greater the portion of biasing from spring 236 that can be used to retract hose 230 when water pressure is turned off, and the less spring bias needed to retract the hose material. Of course, this type of hose can be used with other fluids besides water. Many different means for creating a fluid flow restriction are possible. Multiple constrictions may be used, and may be placed along the length of the hose or may be placed near the end of the hose, for the purpose of creating a restriction on fluid flow, which in turn, will create a back pressure within the hose to help extend it.

In-Wall Extendible Hose—FIG. 19

In FIG. 19 we see an in-wall mounted Linearly Retractable Hose system, comprising; holding case 260, hose tube 258, vacuum hose connector (suction port) 252, Linearly Retractable Hose 250, and hose wand 28. The hose system would mount between the wall studs 264 of a standard home, after which it may be covered up with sheet-rock (gypsum board) except where holding case 260 may protrude. Hose wand 28 is the same hose wand seen in FIGS. 2A–B, and 11 and has been attached to hose 250 for this design. Hose 250 can be of similar construction to the other Linearly Retractable Hoses presented here, and may have an extended length of more than thirty feet. The biasing spring within hose 250 may be made of a multi-conductor so that it can provide electrical power to the hose wand to provide power for tools. Hose 250 can be placed inside and through hose tube 258 which is shown as a clear tube in FIG. 19. Tube 258 may be replaced by an indented channel with the same general shape, which hose 250 can be inserted into from the front. This would allow hose 250 to be extended from the wall all the way to connector 252, which would provide additional useable hose length that would normally be threaded through hose tube 258. Hose 250 can be connected at source connector 252 within hose tube 258, so that central vacuum hose 254 can provide suction air for hose 250. Connector 252 may also slide within hose tube 258 so that the hose end shown near 252 may slide within hose tube 258 to a position near tube entrance port 256. This effectively increases the usable hose length. Hose tube 258 may be a continuous tube with a smooth inner surface or other construction means that provides a similar pipe shaped channel. The interior surface of hose tube 258 can be designed to allow hose 250 to slide easily within it as it expands and contracts during use. Holding case 260 can be attached to hose tube 258 near its entrance port 256. After passing through hose tube 258, hose 250 extends from entrance port 256. Entrance port 256 may be rounded with a smooth curved surface (not shown) to allow hose 250 to slide easily in and out of it at an angle. Holding case 260 can be designed to hold and secure hose wand 28 while not in use. An indented section 262 can be designed to hold hose wand 28 and contains a switch to detect the hose wand's presents so that the central vacuum cleaner turned off when the wand is present in indentation 262. Many ways exist for holding and securing hose wand 28 to holding case 260 and such fastening methods are almost uncountable. The use of the properly shaped indentation 262 may be sufficient to secure wand 28, but other clamping, connecting, latching, binding, locking, etc. devices may also be used to assure secure removable mounting. Finally, a door (not shown) may be place on holding case 260 to provide a clean finish look for the wall in which this hose system is installed. This door can also help hold hose wand 28 in place while not in use.

OPERATIONAL DESCRIPTION

The Linearly Retractable Hose can be operated by differential bias forces from the internal pressure within the hose and bias spring built into the hose. By adjusting the internal pressure of the hose, the net bias (or total bias) longitudinally on the hose can change direction, to either extend or retract the hose. The bias spring allows this retraction or extension of the hose without the internal pressure needing to cross ambient pressure (that is, a vacuum hose maintains a vacuum pressure within the hose during both extending and retracting operation, and a pressure hose maintains a internal pressure above ambient during both extending and retracting operation. Thus, the hose may be extended and contracted by simply changing the internal pressure differential between the interior and exterior of the hose. The longitudinal force generated by this pressure differential will determine whether the longitudinal force from biasing spring can be overcome to provide extension or retraction of the hose.

While the construction of a Linearly Retractable Pressure hose and Linearly Retractable Vacuum hose are nearly the same, the biasing of the integrated spring and the way pressure is controlled within the hoses are quite different. Because of this, we will discuss the operation of each type of hose separately.

Pressure Hose Operation—FIGS. 1A–B, 4, 9A–B and 18

In FIGS. 1A–B we see Linearly Retractable Hose 30 being used as a pressure hose for carrying water (i.e. garden hose). In FIG. 1A, hose 30 is fully retracted and in its relaxed state (zero gauge pressure). The biasing spring within hose 30 has pulled and compressed the hose to its shortest length. Spring tension remaining within hose 30 in this compressed state, and tightly compresses the hose longitudinally so that it may be carried easily. Connector 20 can be attached to a water faucet and water under pressure can flow into hose 30. The water flows through the retracted hose 30, through nozzle connector 22 and into prior art sprinkler 24. Because of restricted passageways within sprinkler 24, pressure quickly builds as water tries to force its way through the sprinkler. Once an internal pressure ($P_1$) is reached the magnitude of the pressure force is greater-than the magnitude of the spring bias force compressing hose 30, and the hose begins to expand (extend) linearly (longitudinally along its length). Water continues to flow into the hose, and the pressure continues to increase as the hose extends. At some point the hose reaches its maximum length at an internal pressure ($P_2$) which is sufficient to overcome the spring bias when fully extended. Internal pressure within hose 30 continues to increase as more and more water flows out of sprinkler 24, but the hose body itself may resists further extending by resisting being stretched in the longitudinal direction. Eventually, an equilibrium is reached between the water flow rate through the sprinkler and the internal pressure within hose 30. This normalization process takes only a second or two after the hose has reached its full length. Final pressure within hose 30 can be very near the faucet static pressure depending on how restricted the water flow is through sprinkler 24.

After hose 30 has reached its full length, it can be used just like any standard garden hose. When the user is done with the hose the user simply shuts off the faucet water supply to the hose. Water pressure quickly drops below pressure ($P_2$) and hose 30 begins to contract. Spring bias within hose 30 keeps the water pressurized and continues to push the water out through sprinkler 24 as it retracts. Thus, the hose slowly retracts as water is forced out through the sprinkler. If the spring bias is strong enough, the hose will also drag the sprinkler back with it to its fully retracted position. Once in its fully retracted position the internal water pressure within hose 30 quickly drops to zero.

In FIGS. 9A–B we see a Linearly Retractable Water Hose 100. This hose is designed to carry water and is attached to water faucet 102 with source connector 106. The hose is in its retracted position in FIG. 9A because the water pressure is turned off at faucet 102. A nozzle 104 is placed on nozzle connector 108 at the end of retractable hose 100. When faucet 102 is turned on, water rushes into hose 100 and pressure builds up inside the hose. Nozzle 104 restricts the rate at which water can escape from the hose and thus causes water pressure to increase within the hose. In FIG. 9b, as this pressure builds, the restoring force (spring bias) within hose 100 is overcome by the internal water pressure and the hose expands linearly to its full length. The hose is designed with a biasing that will allow it to expand to its full length even when nozzle 104 allows large quantities of water to exit. In general, only about one-quarter (one-forth) of a typical household water pressure of 40 to 80 psi should be required to fully extend the hose. Conversely, if too little pressure is needed to extend the hose, the hose will not retract forcefully when pressure is released. If too much pressure is needed to extend the hose, nozzle 104 may need to restrict too much water flow for proper use of the hose. However, for specific applications, the spring biasing can be made significantly different than this one-quarter water pressure value. When the water pressure is turned off, the hose slowly retracts to its compressed state as water is slowly forced out through the open nozzle by the contracting force of the hose. If nozzle 104 is closed before turning off the water, the hose will remain pressurized and will remain extended. Opening the nozzle in this condition will again cause the hose to retract.

In FIG. 18 we see Linearly Retractable Water Hose 230 with nozzle connector 240. Hose 230 is shown in its extended position as if water is flowing, but no water is shown in FIG. 18 to provide clarity to the drawing. The water pressure has expanded inner cover 234 and outer cover 232, and extended bias spring 236 against its biasing. This particular hose is designed to extend even if no nozzle attachment is attached to it. Nozzle connector 240 is attached to the end of hose 230 and provides a restricted hole 248 which water must flow through to exit threaded connector 244. This restriction resists water flow and creates a back pressure within hose 230 which is sufficient to overcome the spring bias of spring 236 when substantially extended. Hole 248 may be made much larger than shown, and such restricted holes may be tailored for the water pressure they are expected to deal with. Restriction hole 248 may also be designed with any of a number of shapes that provide a spray, fan shaped or other type of water output shape. Restriction ring 246 is designed to provide a clean solid beam of water. When water pressure is turned off, hose 230 retracts because of biasing from spring 236. Also, notice that other Linearly Retractable Hoses disclosed here can also be controlled by controlling the fluid flow source. For example, imagine hose 230 continuing to the left off the paper and attaching to a standard water faucet outlet, such as seen in FIGS. 9A–B. The user may control the extending and retracting of the hose by simply controlling the source, i.e. by turning the faucet on and off.

Vacuum Hose Operation—FIGS. 2A–B, 4, 10A–B, 11, and 19

In FIGS. 2A–B we see Linearly Retractable Vacuum Hose 30b being used as a vacuum hose for use with a household vacuum cleaner (not shown) attached at source connector 26. Hose 30b has the opposite spring bias that pressure hose 30 has, which means hose 30b extends fully when in its natural state (no pressure) as seen in FIG. 2B. With connector 26 attached to a vacuum source, suction air begins moving through the end of hose wand body 68, passed opened valve 27 (see FIGS. 2B and 11), and through hose 30b. Suction air through hose 30b and hose wand 28 experiences only minor restrictions to airflow, and insufficient pressure differential is created to cause hose 30b to retract. Even with a standard vacuum nozzle (i.e., dust brush, crevice tool, upholstery tool—not shown) placed on the end of hose wand body 68, the vacuum pressure within hose 30b is still less-than pressure $V_1$ where the hose would begin retracting. Thus, during normal use, hose 30b remains extended and does not tend to pull back as the user is trying to operate it. When the user is finished using the hose, they press down on handle 29 which pushes sliding valve 27 across air passageway 23. In FIG. 11 we can see that channel valve guide 60 helps guide valve 27 into passageway 23. Valve guide 60 also resists the suction force generated by the vacuum that builds within hose 30b when the hose is closed off. Closing valve 27 causes vacuum pressure to increase above $V_1$ within hose 30b which causes the magnitude of the vacuum pressure force to be greater-than the magnitude of the spring bias force, and the hose to begin to contract. As the vacuum pressure builds beyond $V_2$ hose 30b may be fully contracted and can be stored in this retracted state. Vacuum pressure is needed to keep the hose in this position, but many ways exist to clamp (secure) the hose in place so that it cannot extend once vacuum pressure is turned off. Use of a tube or channel to hold the hose and a clip to hold the hose wand works well. Another means of locking the hose in its retracted position is to use a rigid hose extension down the center of the hose as seen in FIGS. 10A and 10B. When the hose is needed again, hose wand 28 is simply twisted to release the locking ring mechanism 122.

In FIG. 11, we see, that during use of hose wand 28, sliding valve 27 is open with stop 64 in contact with the inside of hose wand body 68. With valve 27 open, the spring bias within hose 30b automatically extends the hose. When the user is finished, valve 27 is closed again and the hose automatically retracts itself linearly for storage. The spring tension within hose 30b (FIG. 2A-B), and 114 (FIG. 10A-B) can be increased so that the maximum vacuum pressure is just able to fully contract the hose. This smaller margin of vacuum pressure is acceptable since the user may provide a small amount of physical force to fully compress the hose for storage if vacuum is reduced due to a full bag, old motor, or etc. By doing this, the hose has maximum spring bias for extending the hose, and have greater extending bias when fully extended. When fully extended, this extra spring bias reduces the retracting of the hose caused by vacuum nozzle attachments which may partially close-off the suction passageway. This keeps the hose extended even during heavy use.

In FIG. 10a we see Linearly Retractable Vacuum Hose 110. This hose is designed to carry air under a partial vacuum, such as, from a household central vacuum cleaner. The design shown is for attachment to a central vacuum system which has wall mounted outlets 138. The outlet has an attachment port 134 that receives vacuum suction from the central vacuum (not shown) through standard vacuum piping 136 inside wall 140 of the house. Connector 112 of hose 110 is inserted into attachment port 134 which causes vacuum suction to flow in hose 110. The hose is extended by twisting hose wand 120. This twisting action turns both hose wand 120 and conduit hose extension 116 which operate as a single piece. Locking end 118 on the bottom of extension 116 turns locking end 118 within connector 112 and releases it from connector 112 to allow the hose to extend. With handle 124 unpressed, valve 126 is open and suction air can easily flow. This flow of air reduces the vacuum pressure below the critical level $V_1$ (see FIG. 4), and the hose extends to its full length under the biasing of the spring within hose 114. In FIG. 10b we see extension 116 has been pulled outside of hose 114 and locked into position by twist lock ring 122. Hose 114 and hose wand 120 can now be used like a standard vacuum hose. When finished, the user presses handle 124 inward against hose wand body 129. This action causes valve 126 to be pushed up into the air passageway 128 within wand 120 and close off airflow to the end of the wand. This causes vacuum pressure to increase significantly inside hose 114 to a level beyond $V_2$ (see FIG. 4). This results in hose 114 forcefully contracting as vacuum pressure overcomes the spring biasing within hose 114. The user continues to bold handle 124 down as lock ring 122 is released and extension 116 is slid back inside the now compressed hose 114, causing the hose to conform to the rigid straight shape of extension 116. Locking end 118 of extension 116 is then pushed into the inner portion of connector 112 and turned by twisting hose wand 120 to lock end 118 and connector 112 together to hold the hose in place. Handle 124 may then be released and the hose will remain compressed between wand 120 and connector 112 by extension 116. The entire retractable hose may then be easily removed from outlet 138 for storage.

In FIG. 19 we see a Linearly Retractable Hose system built into the wall of a home. In its stored state, hose 250 would be fully compressed inside hose tube 258 and hose wand 28 mounted in indentation 262 where it is securely held. With vacuum pressure "OFF" hose 250 is trying to extend, but the holding case does not let hose wand 28 move. When the user starts to remove hose wand 250 from holding case 260 an electrical switch (not shown) is activated which turns on the central vacuum cleaner (not shown). The central vacuum cleaner provides suction air to vacuum hose 254 which in turn supplies hose 250 and hose wand 28. As handle 29 is released valve 27 slides open and the vacuum pressure within hose 250 quickly drops and spring bias within hose 250 begins extending it. The user may control this extension process by controlling how much valve 27 is opened. At full extension hose 250 is about four times longer than it was in its stored position. This means the length of hose outside the wall is approximately three times its original length. After the user is done cleaning they may press in handle 29 to close off air passageway 23 which causes hose 250 to retract back into hose tube 258. Once all of hose 250 is inside hose tube 258, hose wand 28 is snapped (or locked, or clipped, etc.) into place in wand indentation 262. As this is done, the electrical switch is turned off and the central vacuum cleaner shuts off (stored position).

Alternatively, for an in-wall design, hose tube 258 may be eliminated and be replaced by a larger holding case with a long indented channel looped around the holding case. The same hose 250 and hose wand 28 may be used. This indented channel provides a place where the user may manually insert the compressed hose and hose wand. The indented channel may need a curved outside sidewall to prevent the hose from slipping out accidently. Once the hose is in the indented channel, the hose wand is snapped into its indentation. This action, can cause power to the central vacuum cleaner to be shut-off, and vacuum pressure can slowly bleed from the hose. Eventually, the hose extends and presses up against the outside sidewall of the indented channel walls and securely holds itself in place. Because the outside sidewall is recessed, it is less likely to slip accidently out of the indented channel. This type of storage makes better use of the hose, since all of the hose can be extended from the wall, however, it does require a much larger wall panel. A rotary joint may be placed between the hose and hose wand to allow the hose wand to spin on the hose. This helps in wrapping the hose into the indented channel because the user can more easily hold down handle 29 as they wrap hose 250 into the indented channel.

Vacuum Hose Wand with Pressure Release—FIGS. 12 Though 17

During the use of a vacuum cleaner hose wand, the end of the hose wand will sometimes seal itself against objects causing the vacuum pressure to suddenly increase inside the hose. This can be a problem for hoses that are designed to extend or retract, because this vacuum pressure tends to pull the hose back into a retracted position. Thus, the user must fight with the hose to keep it from retracting. This is less of a problem with a Linearly Retractable Hose, because of the pre-stressed spring, but the hose can still pull on the hose wand when inadvertent closure of the hose wand end occurs. To solve this problem a pressure relief valve may be added to the hose wand, so if the hose end is closed-off, vacuum pressure cannot increase too much. The valve may be placed anywhere on the hose wand to help keep the hose from strongly contracting. For the Linearly Retractable Vacuum Hose, the pressure relief valve must be placed forward of the means to seal the suction passageway (that is, the airflow control valve between suction source and relief valve). In this way, the relief valve will not effect the ability of the sealing means to completely close off the vacuum hose. If the relief valve was placed before the sealing means, the valve would open and bleed air into the hose preventing a complete seal. As we will see later in FIGS. 15 through 16, the airflow control valve and the relief valve can be combined into a single actuating valve. The relief valve may also be used on standard prior art retractable vacuum hoses, which have a spring biased to retract.

In FIG. 12 we see a simple hose wand 70 attached to a standard prior art retractable hose 71 (presently used on many vacuum cleaners). If the end of hose wand body 79 is closed off by material being cleaned, the pressure within channel 76 increases causing a retracting force on hose 71. To reduce this problem, relief valve 72 can be added which opens and bleeds air in through port 73 when vacuum pressure inside channel 76 reaches a predetermined value. Once vacuum pressure rises above this value, valve 72 can be pushed open by the pressure differential between the ambient air and vacuum pressure within body 75. Spring clip 78 provides the proper biasing so that valve 72 opens at the proper pressure. The size of port 73 and the biasing of valve 72 control how much air can be bled into the interior of body 75, so that sufficient air can be bled into the hose wand to keep vacuum pressure below the desired maximum. By limiting the maximum vacuum pressure, the maximum retraction force on the hose wand may also limited, and thus the force exerted on the user. Valve 72 can be designed so that partial closure of the open end of body 79 does not increase vacuum pressure sufficiently to cause valve 72 to open.

In FIG. 13 we see hose wand 80 with the front half of hose wand body 85 removed. Hose wand body 85 may be attached directly to a Linearly Retractable Vacuum Hose 81. A swivel adaptor may be placed between them body 85 and hose 81 if desired, or other pivotal joint structure that suction air can flow through. Pressure relief valve 82 can be similar in design to valve 72, and bleed air into air passageway 89 when vacuum pressure within air passageway 89 increases beyond a predetermined value. This predetermined vacuum for relief valve 82 may be much higher than for relief valve 72, because Linearly Retractable Hoses have significant extending bias built into them. This means that hose 81 can remain extended even when considerable vacuum pressure exists within hose 81 and hose wand 80. Spring clip 98 would thus may need to be stiffer than spring clip 78 (provided the size of valve 82 and 72 are the same) to provide the higher opening pressure. When vacuum pressure within passageway 89 increases beyond the predetermined value, valve 82 begins to open port 83 and bleed air into air channel 89. This effectively reduces the "maximum operating vacuum pressure" that can be achieved by blocking off the end of hose wand body 85.

During normal operation, control valve 94 is open to allow unrestricted airflow through air passageway 89 and hose 81. However, when the user wants to stow hose 81 they may squeeze handle 87, which forces control valve 94 into air channel 89 and substantially blocks-off the suction airflow. When this is done, vacuum pressure increases to its maximum value within hose 81 (note that this maximum vacuum pressure value is greater-than vacuum pressure obtainable by blocking off the hose wand end which opens relief valve 82). At maximum vacuum, hose 81 can be designed to retract for easy storage. Upon releasing handle 87, spring clip 95 opens valve 94 allowing suction air to again flow though passageway 89, and hose 81 automatically extends to its full length.

In FIG. 14 we see the left-half of hose wand 140 (right-half, mirror image of left-half, removed for clarity) attached to Linearly Retractable Vacuum Hose 171. During normal use, handle 148 is un-depressed as shown, and suction air can freely flow through air passageway 151. Vacuum nozzle attachments can be connected to the end of hose wand body 145 for cleaning. If the end of hose wand body 145 is restricted too much vacuum pressure within hose wand 140 increases and relief valve 142 opens to bleed air into air passageway 151. This effectively limits the maximum vacuum pressure that can be obtained within hose wand 140 and hose 171 when control valve 149 is open. When the user is finished cleaning with the vacuum hose they would press handle 148 with their index and middle fingers to close off air passageway 151 with valve plate 149 in the alternate position 149*a*. When control valve 149 is closed by pushing on handle 148, vacuum pressure behind valve 149 in hose 171 (position 149*a*), can increase to the maximum vacuum pressure that the vacuum cleaner (not shown), to which hose 171 is attached, can provide. This high vacuum pressure can cause hose 171 to retract to its fully retracted position so it may be easily stored. Spring clip 156 provides the biasing to return control mechanism 146 to its open position once the user has released handle 148. The force the user must use to depress handle 148 is greater-than the force needed on handle 87 in FIG. 13, because handle 148 must overcome the vacuum pressure force on valve plate 149. This force can be several pounds depending on the size of valve plate 149 and the maximum vacuum pressure produced by the vacuum cleaner to which hose 171 is attached.

In FIG. 15 we see a perspective view of hose wand 160 with its right-half body section removed. For clarity of the drawing in FIG. 15, handle 168 has been pressed-in slightly to lift relief valve 172 away from valve port 164. While in normal operation, relief valve/stop 172 can be pressed against relief valve port 164 preventing air from entering air passageway 162. When suction vacuum is flowing through hose 171 and valve 174 is open, the end of hose wand body 165 may be used for cleaning and attachment of vacuum nozzles.

Polymer spring 167 provides the necessary biasing to keep relief valve/stop 172 seated on valve port 164. If the end of hose wand body 165 is significantly closed-off, vacuum pressure builds up and pressure differential between the inside and outside of body 165 is sufficient to lift relief valve 172 off its port 164. This causes air to bleed into air passageway 162 and limit the maximum vacuum pressure that can be maintained without completely closing control valve 174. The biasing of relief valve/stop 172 can be designed to limit maximum vacuum pressure to approximately the vacuum pressure needed to start retracting Linearly Retractable Vacuum Hose 171. This means that during cleaning, the user does not have to worry about the vacuum hose retracting because vacuum pressure cannot rise sufficiently to the spring bias with hose 171. When the user does want to retract the hose, they simply depress handle 168 which opens up relief valve port 164. As the user continues to squeeze handle 168, control valve 174 slides up across air passageway 162 and closes it off. Because control valve 174 is substantially perpendicular to the vacuum pressure differential across the valve, handle 168 requires very little force to completely close-off air passageway 162. Once closed off, vacuum pressure builds, and overcomes the spring bias within hose 171, and pulls the hose back into its retracted position for storage.

In FIG. 16 we see a perspective view of hose wand 180 with its right-half body section removed. The end of hose wand body 185 can be used for cleaning with vacuum nozzle attachments when suction vacuum is flowing through Linearly Retractable Hose 191 and air passageway 181. Normal operating mode can be when sliding control valve 194 is open and relief valve/stop 192 is pressed against relief valve port 197 preventing air from entering. Valve mechanism 199 can be biased by a spring (not shown for clarity of drawing) in holder 195, which may be very similar to spring 156 and holder 150 in FIG. 14. Hinge 184 can be spring biased to provide the necessary biasing to keep relief valve/stop 192 seated over valve port 197. If the end of hose wand body 185 is significantly closed-off (blocked-off), vacuum pressure builds up and the pressure differential between the inside and outside of body 185 can be sufficient to lift relief valve 192 off its port 197. This causes air to bleed into air passageway 181 and limit the maximum vacuum pressure that can be maintained without completely closing control valve 194. The biasing of relief valve/stop 192 at hinge 184 can be designed to limit maximum vacuum pressure to approximately the vacuum pressure that will start retracting Linearly Retractable Vacuum Hose 191. This means that during cleaning, the user does not have to worry about the vacuum hose retracting because vacuum pressure cannot rise sufficiently to cause hose 191 to strongly retract. When the user does want to retract the hose, they simply depress handle 188 which opens up relief valve port 197. As the user continues to squeeze handle 188, control valve 194 slides up across air passageway 181 and closes it off against slot 183 as shown in FIG. 16. Even though relief valve port 197 is open at this time no air flows because control valve 194 has completely blocked off suction air from the vacuum hose. Also, because control valve 194 is approximately perpendicular to the vacuum pressure differential across the valve, handle 188 requires very little force to completely close-off air passageway 181. Once closed-off, vacuum pressure pulls hose 191 back into its retracted position for storage. Hose 191 and hose wand 180 must be locked into place before vacuum pressure can be turned off otherwise hose 191 will again extend to its full length even with control valve 194 closed. When the hose needs to be used again, it can be simply unlocked from its locked position and it automatically expands to it full length due to the spring bias within hose 191.

In FIG. 17 we see another vacuum hose wand design 200. For this design pressure relief valve 72 provides the same function that it did in FIGS. 2A–B and 11. That is, opening when hose wand end 202 is blocked to reduce the maximum vacuum pressure to prevent unwanted retracting of hose 222. During operation, thumb control 210 can be pushed fully forward in channel 214. This lifts segmented valve 212 out of air passageway 204 to provide airflow through wand 200 and hose 222. When the user is done cleaning and wants to retract the hose, they pull back on thumb control 210 which slides segmented valve backward in channel 214 and down into air channel 204. This effectively blocks air from flowing through hose wand 200 and vacuum pressure within hose 222 increases to its maximum vacuum pressure. This causes the spring bias in hose 222 to be overcome by the vacuum force and hose 222 retracts forcefully for storage.
Ramifications, and Scope Although the above description of the invention contains many specifications, these should not be viewed as limiting the scope of the invention. Instead, the above description should be considered illustrations of some of the presently preferred embodiments of this invention. For example, a Linearly Retractable Vacuum Hose may be stored locked in its retracted position in any of a number of ways. One such method is shown in FIG. 10A-B with a central hose extension that can lock the hose wand 120 to suction connector 112 and hose extension 116 forces hose 114 to remain aligned while stored. Another way would be to have an external tube for the vacuum hose to retract into and then have the hose wand lock into place near the end of the tube. The tube would thus provide side support for the hose to prevent it from springing out once vacuum pressure was turned off. Another way would be to have an open curved-channel, which the retracted hose could fit in with the hose wand locking at one end. Then when vacuum pressure was turned off, the hose would expand outward against the curved channel to hold itself in place. Similarly, other methods could be used to store a spring-loaded Linearly Retractable Vacuum Hose. In addition, many types and styles of biasing springs can be used for the hose design. For example, plastic or composite materials can be used for the spring. Even the hose cover material itself can be used as the biasing means if made of a resilient material that provides a consistent restoring force. The biasing spring(s) can also be placed on the interior or exterior of the hose. Even elastic bands can be used to bias a linearly retractable hose. The linearly retractable hose can also have normal hose section connected to it. For example, a short section (2 to 4 feet) of standard hose may be connected on the source end so that the extendible part of the hose can lay flat on the ground to prevent the hose from expand the wrong way when extending. Similarly, a standard hose section may be placed on the nozzle end to make it easier for a user to grasp. Thus, the scope of this invention should not be limited to the above examples, but should be determnined from the following claims:

We claim:

1. A hose, comprising:
 a) a flexible elongated body comprising a first end, a second end, and an interior channel defined along its length for transporting a fluid material from the second end to the first end during use; wherein said flexible elongated body is sufficiently flexible to extend and retract linearly along its length between a substantially extended position and a substantially retracted position;
 b) a biasing means interconnected with said flexible elongated body for generating a first force tending to extend said flexible elongated body longitudinally along its length;
 c) wherein said first end comprises a connector designed to connect to a vacuum pressure source capable of providing a vacuum pressure substantially below ambient air pressure;
 d) wherein said second end is adapted to attach to a valve means for selectively allowing and restricting the flow of the fluid material entering said interior channel from the ambient environment, wherein said valve means when restricting the fluid material from entering said second end causes said vacuum pressure source to create a lower pressure within said interior channel, wherein the lower pressure is substantially below ambient pressure, and
 e) wherein said lower pressure generates a second force opposed to said first force, wherein said second force is sufficiently great to overcome said first force when in the substantially extended position, whereby the second force tends to retract the flexible elongated body longitudinally along its length, and
 f) a pressure relief valve defined on said hose for bleeding air into said interior channel when the second end is substantially closed-off during use, wherein said pressure relief valve is positioned on the hose between said vacuum pressure source and said valve means.

2. The hose in claim 1, wherein; said pressure relief valve is integrated into said valve means.

3. The hose in claim 1, further comprising; a support structure mounted to said flexible elongated body, wherein said support structure is designed to connect and disconnect from said first and/or second ends, wherein said support structure comprises a holding means for securing said flexible elongated body in said substantially retracted position, wherein said support structure comprises a tube designed for conducting the fluid material flowing through the flexible elongated body, wherein said tube is longitudinally slidable with respect to said flexible elongated body and able to extend beyond the end of the flexible elongated body, whereby said tube acts as a hose extension to lengthen the reach of the hose.

4. A hose, comprising:
 a) a flexible elongated body having a first end, a second end, and an interior channel defined along its length for transporting air from the second end to the first end, wherein said first end is designed for attachment to the suction port of a vacuum cleaner, wherein said second end is adapted to receive air from the ambient environment;

b) a first biasing means interconnected with said flexible elongated body for generating a first force directed longitudinally along said flexible elongated body and tending to extend said flexible elongated body;

c) a valve means attached to said second end for substantially controlling the flow of air through said interior channel, wherein said vacuum cleaner generates a pressure differential between the inside of said interior channel and the ambient environment when said valve means is restricting air flow, wherein said pressure differential causes a second force directed longitudinally along said flexible elongated body and opposed to said first force, wherein said second force magnitude is adjustable between a force greater-than said first force and a force less-than said first force, and d) wherein said flexible elongated body is responsive to said second force and is sufficiently flexible to extend and retract longitudinally along its length in response to said second force;

e) wherein said flexible elongated body has a substantially retracted position and a substantially extended position and wherein said flexible elongated body retracts when said second force is greater-than said first force and extends when said second force is less-than said first force;

f) a support structure mounted to said flexible elongated body, wherein said support structure is designed to be removably connected to said first and/or second ends, wherein said support structure includes a holding means for holding said flexible elongated body in said substantially retracted position when both said first and second ends are supported by said support structure, and g) wherein said support structure defines a conduit having an air channel connected with said interior channel for transporting the suction air therethrough, wherein said conduit is longitudinally slidable with respect to said flexible elongated body and able to extend beyond at least one end of the flexible elongated body, whereby said conduit acts as a hose extension to lengthen the reach of the hose.

5. The hose in claim 4, wherein said flexible elongated body tends to retract over the outside of said conduit when said second force is greater-than said first force.

6. The hose in claim 4, wherein said support structure is defined around the exterior of said flexible elongated body, wherein said flexible elongated body is retractable into said air channel for storage when in said substantially retracted position.

7. The hose in claim 4, wherein said support structure is substantially retractable within said interior channel for storage in its substantially retracted position.

8. A hose, comprising:

a) a flexible elongated body comprising a first end, a second end, and an interior channel defined along its length for transporting air from the second end to the first end during use; wherein the flexible elongated body is sufficiently flexible to extend and retract linearly along its length between a substantially extended position and a substantially retracted position;

b) a biasing means interconnected with the flexible elongated body for generating a first force tending to extend the flexible elongated body longitudinally along its length;

c) a connector defined on the first end and designed to connect to a vacuum pressure source capable of providing a vacuum pressure substantially below ambient air pressure;

d) wherein the second end is adapted to attach to a valve means for selectively allowing and restricting the flow of the air entering the interior channel from the ambient environment, wherein the valve means when restricting the air from entering the second end causes the vacuum pressure source to create a lower pressure substantially below ambient air pressure within the interior channel, and e) wherein the lower pressure generates a second force opposed to the first force wherein the second force is sufficiently great to overcome the first force in the substantially extended position, whereby the second force tends to retract the flexible elongated body longitudinally along its length, and f) a support structure slidably mounted to the flexible elongated body, wherein the support structure comprises a holding means for securing the flexible elongated body in the substantially retracted position, wherein the support structure comprises a tube designed for conducting air flowing through the flexible elongated body, wherein the tube is longitudinally slidable with respect to the flexible elongated body and able to extend beyond the end of the flexible elongated body, whereby the tube acts as a hose extension to lengthen the reach of the hose.

9. The hose in claim 8, wherein; said connector is defined on said support structure, wherein said first end is longitudinally slidable with respect to said support structure.

10. The hose in claim 9, wherein said tube is positioned around the exterior of said flexible elongated body for storage in its retracted position.

* * * * *